US010846903B2

United States Patent
Mitchell et al.

(10) Patent No.: US 10,846,903 B2
(45) Date of Patent: *Nov. 24, 2020

(54) SINGLE SHOT CAPTURE TO ANIMATED VR AVATAR

(71) Applicant: Disney Enterprises, Inc., Burbank, CA (US)

(72) Inventors: Kenneth Mitchell, Earlston (GB); Charles Malleson, Guilford (GB); Ivan Huerta Casado, Barcelona (ES); Martin Klaudiny, Zilina (SK); Malgorzata Edyta Kosek, Edinburgh (GB)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,044

(22) Filed: May 20, 2019

(65) Prior Publication Data

US 2019/0279411 A1    Sep. 12, 2019

Related U.S. Application Data

(63) Continuation of application No. 15/631,576, filed on Jun. 23, 2017, now Pat. No. 10,311,624.

(51) Int. Cl.
*G06T 13/40* (2011.01)
*G06T 17/00* (2006.01)
(Continued)

(52) U.S. Cl.
CPC .......... *G06T 13/40* (2013.01); *G06K 9/00255* (2013.01); *G06K 9/00275* (2013.01);
(Continued)

(58) Field of Classification Search
CPC ......... G06T 13/40; G06T 17/00; G06T 19/20; G06K 9/00255; G06K 9/00275
(Continued)

(56) References Cited

U.S. PATENT DOCUMENTS 7,184,047 B1    2/2007  Crampton
8,390,680 B2    3/2013  Perez
(Continued)

OTHER PUBLICATIONS

Shreve, Matthew, et al.; High-resolution 3D surface strain magnitude using 2D camera and low-resolutiondepth sensor; Pattern Recognition Letters 50 (2014) pp. 34-42.
(Continued)

*Primary Examiner* — Hai Tao Sun
(74) *Attorney, Agent, or Firm* — Esplin & Associates, PC

(57) ABSTRACT

Presented herein are systems and methods configured to generate virtual entities representing real-world users. In some implementations, the systems and/or methods are configured to capture user appearance information with imaging devices and sensors, determines correspondence values conveying correspondences between the appearance of the user's body or user's head and individual ones of default body models and/or default head models, modifies a set of values defining a base body model and/or base head model based on determined correspondence values and sets of base values defining the default body models and/or default head models. The base body model and/or base head model may be modified to model the appearance of the body and/or head of the user.

12 Claims, 10 Drawing Sheets

(51) Int. Cl.
  *G06T 19/20* (2011.01)
  *G06K 9/00* (2006.01)
(52) U.S. Cl.
  CPC .............. *G06T 17/00* (2013.01); *G06T 19/20* (2013.01); *G06T 2200/08* (2013.01); *G06T 2219/2016* (2013.01)
(58) Field of Classification Search
  USPC ......................................................... 345/419
  See application file for complete search history.

(56) References Cited

U.S. PATENT DOCUMENTS

| | | | |
|---|---|---|---|
| 9,001,118 B2 | 4/2015 | Molyneaux | |
| 9,013,489 B2 | 4/2015 | Evertt | |
| 9,189,886 B2 | 11/2015 | Black | |
| 9,325,936 B2 | 4/2016 | Cullen | |
| 9,361,723 B2 | 6/2016 | Zhou | |
| 2006/0009978 A1 | 1/2006 | Ma | |
| 2011/0298897 A1 | 12/2011 | Sareen | |
| 2012/0038739 A1 | 2/2012 | Welch | |
| 2012/0062719 A1 | 3/2012 | Debevec | |
| 2012/0299912 A1 | 11/2012 | Kapur | |
| 2013/0038601 A1* | 2/2013 | Han | G06F 3/011 345/419 |
| 2013/0100140 A1* | 4/2013 | Ye | G06T 13/20 345/473 |
| 2014/0176565 A1 | 6/2014 | Adeyoola | |
| 2014/0375557 A1 | 12/2014 | Leyvand | |
| 2015/0146923 A1* | 5/2015 | Lee | G06K 9/00624 382/103 |
| 2015/0356767 A1 | 12/2015 | Suma | |
| 2016/0027200 A1 | 1/2016 | Corazza | |
| 2016/0078663 A1* | 3/2016 | Sareen | G06T 19/00 345/419 |
| 2016/0163084 A1 | 6/2016 | Corazza | |
| 2016/0203361 A1 | 7/2016 | Black | |
| 2017/0273639 A1 | 9/2017 | Iscoe | |

OTHER PUBLICATIONS

Wei, Xiaolin, et al.; Accurate Realtime Full-body Motion Capture Using a Single Depth Camera; ACM Transactions on Graphics, vol. 31, No. 6, Article 188, Publication Date: Nov. 2012; 12 pages.

* cited by examiner

SINGLE SHOT CAPTURE TO ANIMATED VR AVATAR

FIELD

This disclosure relates to system and methods configured to generate virtual entities representing real-world users.

BACKGROUND

An increase in popularity of virtual reality systems has spawn a number of unique and efficient systems to provide a user with a greater level of immersion a virtual reality space.

SUMMARY

One or more aspects of this disclosure describe systems and methods configured to generate virtual entities representing real-world users. The generated virtual entities may be used in virtual environments. The virtual environments may include one or more of a gaming environment, an animation, a video, and/or other virtual environments. By generating virtual entities representing real-world users that may be used within the virtual environments, the systems and methods presented herein may increase a level of immersion the real-world users have when interacting with the virtual environment. An implementation of a system described herein may generate virtual entities representing real-world users using one or more of one or more imaging devices, one or more depth sensors, one or more physical processors, and/or other components. The system setup may provide the users with quick and affordable systems to generate virtual entities representing real-world users; and therefore may increase the viability in using virtual entities representing real-world users in virtual environments.

A system configured to generate virtual entities representing real-world users may include one or more of one or more servers, one or more computing platforms, one or more imaging device, one or more depth sensors, a network, one or more external resources, and/or other components.

The one or more servers may include one or more of one or more physical processors, one or more non-transitory electronic storage, and/or other components. The one or more physical processors may be configured by computer program instructions. Executing the computer program instructions may cause the one or more physical processors to facilitate generating one or more virtual entities representing one or more real-world users. The computer program instructions may include one or more of an image component, a body component, a head component, and/or other components.

In some implementations, non-transitory electronic storage may be configured to store one or more of a base body model, one or more default body models, a skeleton model, a base head model, one or more default head models, and/or other information.

The base body model may be defined by a set of values for a set of body modeling parameters. The set of values for the set of body modeling parameters may specify one or more characteristics of the base body model. The base body model may be a virtual body model of a generic male and/or female body type. The generic male and/or female body type may be an average body type of an average human (e.g., 50th percentile human figure and/or other consideration of "average"). The generic male and/or female body type may be one or more of an endomorph body, a mesomorph body, an ectomorph body, and/or other generic body types.

The default body models may define individual default body models for modeling an individual body type. The individual body types may be defined by an individual set of base values for a set of body modeling parameters. The individual default body models for modeling the individual body type may include individual virtual body models with body shapes representative of human body characteristics. The human body characteristics may include a size and/or shape of one or more of an upper body, a lower body, an overall body size, and/or other human body characteristics.

The skeleton model may be configured to facilitate animated movement of the base body model. The skeleton model may include one or more sets of interconnected bones, movable joints, and/or other components defined by one or more skeleton model value. The skeleton model may be mapped onto and/or coupled with the base body model and/or other body models such that the base body model and/or other body models may be controlled by the one or more sets of interconnected bones and movable joints.

The base head model may be defined by a set of values for a set of head modeling parameters. The base head model may be of a virtual head model of a generic human head. The generic human head may be an average appearance of a human head. The generic human head may be specified by an average head shape and/or face proportion of the human head.

The default head models may define individual default head models for modeling an individual head type. The individual head type may be defined by an individual set of base values for a set of head modeling parameters. The individual default head models for modeling individual head types may include individual virtual head models with heads representative of human head characteristics. The human head characteristics may include one or more of a head shapes and/or facial feature. The individual head models of the individual head types may include human head characteristics with head shapes and/or facial feature with extreme features proportions.

In some implementations, the individual default head models may include individual virtual head models for facilitating animating facial movement of the base head model. The facial movement may be associated with one or more of a speech, a facial expression, and/or other facial movements. The facial movement may be conveyed by morphing the base head model with the individual default head models.

In some implementations, the head and/or body models may comprise "blendshape" meshes which include a base (neutral) mesh and several blendshape meshes for representing different characteristics of the body, head, and/or face. These meshes may be pre-defined. An output mesh may be a weighted sum of these blendshapes, where the weightings may be variables optimized by the system (e.g., via correspondence values) to match an appearance of a user.

In some implementations, individual ones of the one or more imaging devices may be configured to generate output signals defining image information and/or other information. The image information may include visual content present within a field-of-view of the imaging device. In some implementations, the image information of an imaging device may facilitate determining at least part of user appearance information and/or other information.

In some implementations, one or more depth sensors may be configured to generate output signals defining depth information and/or other information. The depth information may convey range of surfaces of objects in a real-world environment. The depth information conveying range of surfaces of objects in the real-world environment may include at least part of user appearance information and/or other information. In some implementations, the depth information may convey information including one or more of a user's body shape, a body outline, a body silhouette, and/or other information associated with the user's body. The one or more of the user's body shape, the body outline, the body silhouette, and/or other information associated with the user's body may be conveyed by one or more of an image, a video, and/or other visual content. The one or more of the image, the video, and/or other visual content may be defined by one or more of an array of pixels. The depth information may be stored in one or more electronic storage and/or other storage locations.

In some implementations, one or more of the imaging device, one or more of the depth sensors, and/or other devices and/or sensors may be positioned adjacent to one another.

The user appearance information generated from output signals of one or more of one or more imaging devices and/or one or more depth sensors may include one or more of user head information, user body information, and/or other information. The user appearance information may be generated from one or more of depth information, image information, and/or other information.

In some implementations, one or more of the imaging devices, one or more of the depth sensors, and/or other devices and/or sensors may be positioned at one or more specified distances from the user.

In some implementations, one or more of the one or more imaging devices, one or more depth sensors, and/or other devices and/or sensors may be positioned at one or more specified heights relative to the ground.

In some implementations, there may be one or more light boxes configured to highlight the user. The one or more light boxes may be one or more light sources directed toward the user. A given light box may illuminate the user.

In some implementations, the user may stand in front of the one or more imaging device and/or the one or more depth sensor in one or more poses. The one or more poses may include one or more of having the hands along the side of the body, having the hands above the head, being in a T-pose, and/or other poses.

The image component may be configured to obtain output signals and/or other information from one or more of the one or more imaging devices, one or more depth sensors, and/or other sensors, devices, and/or storage locations. The image component may determine and/or obtain the user appearance information and/or other information from output signals. The image component may determine and/or obtain the user appearance information and/or other information from one or more of computing platforms, electronic storage, and/or storage locations.

In some implementations, image component may determine the user's gender from the user appearance information.

The user body information may specify the appearance of the body of a real-world user.

In some implementations, the user's gender may be determined by the user body information using machine learning technique and/or other techniques.

The user head information may specify the appearance of the head of a real-world user. The user head information may include visual content (e.g., images, texture maps, and/or other information) of one or more of the user's facial features, head shape, facial textures, facial expressions, and/or other visual content associated with the user's head.

In some implementations, the body component may be configured to generate a virtual body of a virtual entity representative of the body of the real-world user. The body component may be configured to determine correspondence values conveying correspondences between the appearance of the user's body and individual ones of the default body models. The body component may generate the body of the virtual entity representing the real-world user based on the determined correspondence values by modifying the set of values defining the base body model based on determined correspondence values and the sets of base values defining the default body models such that the base body model may be modified to model the appearance of the body of the user.

In some implementations, the head component may be configured to generate a virtual head of a virtual entity representative of the head of the real-world user. The head component may be configured to determine correspondence values conveying correspondences between the appearance of the head and individual ones of the default head models. The head component may generate the head of the virtual entities representing real-world users based on the correspondence values by modifying the set of values defining the base head model based on determined correspondence values and the sets of base values defining the default head models such that the base head model may be modified to model the appearance of the head of the user.

In some implementations, a user's face texture information may be mapped onto the face of the virtual head of the virtual entity generated by the head component.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
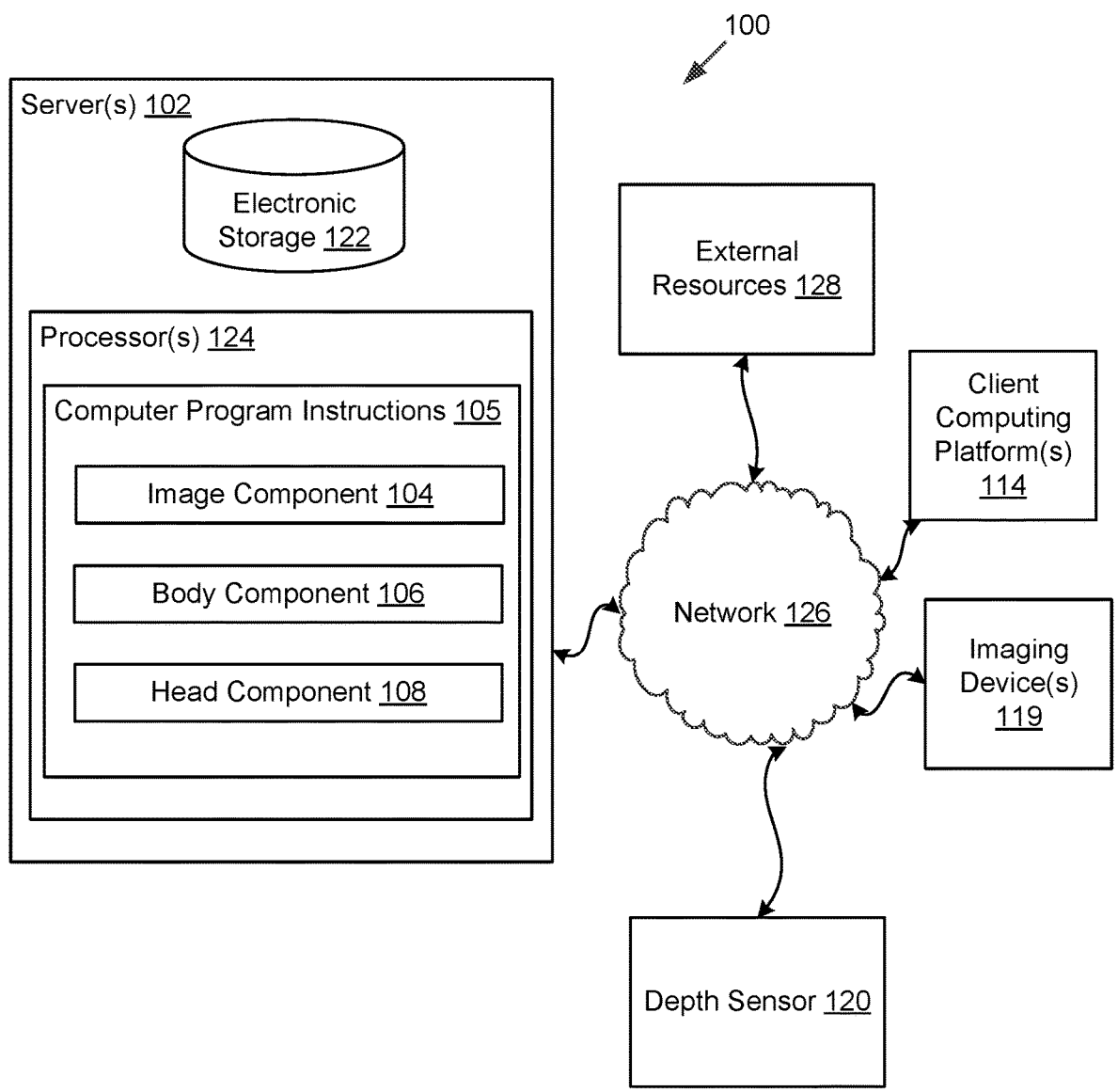
FIG. 1 illustrates a system configured to generate virtual entities representing real-world users.

FIG. 1 illustrates a system 100 configured to generate virtual entities representing real-world users may include one or more of one or more servers 102, one or more computing platforms 114, one or more imaging device(s) 119, one or more depth sensor 120, a network 126, one or more external resource 128, and/or other components.

The one or more servers 102 may include one or more of one or more physical processors 124, one or more non-transitory electronic storage 122, and/or other components. The one or more physical processors 124 may be configured by computer program instructions 105. Executing the computer program instructions 105 may cause the one or more physical processors 124 to facilitate generating one or more virtual entities representing one or more real-world users. The computer program instructions 105 may include one or more of an image component 104, a body component 106, a head component 108, and/or other components.

In some implementations, non-transitory electronic storage 122 may be configured to store one or more of a base body model, a default body model, a skeleton model, a base head model, a default head model, and/or other information.

The base body model may be defined by a set of values for a set of body modeling parameters. The set of values for the set of body modeling parameters may specify one or more characteristics of the base body model. The base body model may be a virtual body model of a generic male and/or female body type. The generic male and/or female body type may be an average body type of an average human. The generic male and/or female body type may be one or more of an endomorph body, a mesomorph body, an ectomorph body, and/or other generic body types. In a non-limiting example, the endomorph body maybe the male and/or female body type with a large frame and low muscle definition; the mesomorph body may be the male and/or female body type with a large frame and low muscle definition; and the ectomorph body may be the male and/or female body type with a small frame and low muscle definition. The height of the base body model of the generic male and/or female body type may be based on the height of a user. The height of the user may be determined by a user appearance information. The user appearance information for determining the user's height may be a user head information, a user body information, and/or other information. In a non-limiting example, the generic male and/or female body type may be a slim male and/or female with an ectomorph body and a height of 200 centimeters.

The set of body modeling parameters for the base body model may include one or more of a height parameter, a body composition parameter, an arm parameter, a leg parameter, a neck parameter, a head parameter, a hand parameter, a foot parameter, and/or other body modeling parameter.

A value of a height parameter may specify a height of a base body model.

A value of a body composition parameter may specify one or more of a fat content, bone content, water content, muscle content, and/or other content of a body.

A value of an arm parameter may specify one or more of a length of an arm of a base body model, a width of an arm of the base body model, a depth of an arm of the base body model, and/or other information.

A value of a leg parameter may specify one or more of a length of a leg of a base body model, a width of a leg of the base body model, a depth of a leg of the base body model, and/or other information.

A value of a neck parameter may specify one or more of a length of a neck of a base body model, a width of a neck of the base body model, a depth of a neck of the base body model, and/or other information.

A value of a head parameter may specify one or more of a length of a head of a base body model, a width of a head of the base body model, a depth of a head of the base body model, and/or other information.

A value of a hand parameter may specify one or more of a length of a hand of a base body model, a width of a hand of the base body model, a depth of a hand of the base body model, and/or other information.

A value of a foot parameter may specify one or more of a length of a foot of a base body model, a width of a foot of the base body model, a depth of a foot of the base body model, and/or other information.

The base body model may be modified by one or more of a default body models and/or other information. The base body model may be modified based on one or more of a determined correspondence value and/or sets of base values defining the default body models such that the base body model may be modified to model the appearance of the body of the user.

The default body models may define individual default body models for modeling an individual body type. The individual body types may be defined by an individual set of base values for a set of body modeling parameters. The individual default body models for modeling an individual body type may include individual virtual body models with body shapes representative of human body characteristics. The human body characteristics may include a size and/or shape of one or more of an upper body, a lower body, an overall body size, and/or other human body characteristics.

In a non-limiting example, the body shapes representative of the human body characteristic may include one or more of a pear body shape, a reverse pear body shape, a big bone body shape, a male body shape, a female body shape, and/or other body shapes. The pear-shaped body may have a larger lower body relative to other parts of the body. The reverse pear body shape may have a larger upper body relative to other parts of the body. The big bone body shape may have a larger overall body relative to the base body model. The male body shape may have more masculine body characteristics compared to a female body shape. The female body shape may have more feminine body characteristics compared to the male body shape. The male body shape may have a larger body frame compared to the female body frame. The examples described above is for illustrative purposes and is not intended to be limiting.

The one or more of default body models may modify the base body model and/or other information. The default body model may modify the set of values defining the base body model based on one or more of a determined correspondence value and the sets of base values defining the default body models such that the base body model may be modified to model the appearance of the body of the user.

The base body model may be associated with a skeleton model. The skeleton model may be coupled with the base body model. The skeleton model may be configured to facilitate animated movement of the base body model. The skeleton model may include one or more sets of interconnected bones, movable joints, and/or other components defined by one or more skeleton model value. The skeleton model may be mapped onto and/or coupled with the base body model and/or other body models such that the base body model and/or other body models may be controlled by the one or more sets of interconnected bones and movable joints.

The base head model may be defined by a set of values for a set of head modeling parameters. The base head model may be of a virtual head model of a generic human head. The generic human head may be an average appearance of a human head. The generic human head may be specified by an average head shape and/or face proportion of the human head (e.g., $50^{th}$ percentile human head, and/or other information).

In some implementations, the set of head modeling parameters may include one or more of a of an eye parameter, an eyebrow parameter, a nose parameter, a mouth parameter, an ear parameter, a chin parameter, a cheek parameter, a forehead parameter, a jawline parameter, a head shape parameter, and/or other parameters of the virtual head model of the generic human head.

A value of an eye parameter may specify one or more of a length of an eye of a base head model, a width of an eye of the base head model, a depth of an eye of the base head model, and/or other information.

A value of an eyebrow parameter may specify one or more of a length of an eyebrow of a base head model, a width of an eyebrow of the base head model, a depth of an eyebrow of the base head model, and/or other information.

A value of a nose parameter may specify one or more of a length of a nose of a base head model, a width of a nose of the base head model, a depth of a nose of the base head model, and/or other information.

A value of a mouth parameter may specify one or more of a length of a mouth of a base head model, a width of a mouth of the base head model, a depth of a mouth of the base head model, and/or other information A value of an ear parameter may specify one or more of a length of an ear of a base head model, a width of an ear of the base head model, a depth of an ear of the base head model, and/or other information A value of a chin parameter may specify one or more of a length of a chin of a base head model, a width of a chin of the base head model, a depth of a chin of the base head model, and/or other information.

A value of a cheek parameter may specify one or more of a length of a cheek of a base head model, a width of a cheek of the base head model, a depth of a cheek of the base head model, and/or other information.

A value of a forehead parameter may specify one or more of a length of a forehead of a base head model, a width of a forehead of the base head model, a depth of a forehead of the base head model, and/or other information.

A value of a jawline parameter may specify one or more of a length of a jawline of a base head model, a width of a jawline of the base head model, a depth of a jawline of the base head model, and/or other information.

A value of a head shape parameter may specify one or more of a length of a head of a base head model, a width of a head of the base head model, a depth of a head of the base head model, and/or other information.

In some implementations, a feature map may specify information related to one or more of facial features, head shape, and/or other information. The feature map may be one or more of a one-dimensional feature map, a two-dimensional feature map, a three-dimensional feature map, and/or other dimensional feature map. The feature map may include one or more of a set of feature points and/or other information. The set feature points may indicate one or more of a height, a width, a depth, a location, and/or other information of the facial features. Other information considered may include focal length of one or more sensors. By way of non-limiting illustration, the focal length may be the focal length of one or more of depth sensor 120, one or more imaging device(s) 119, and/or other sensors of at least parts of the user.

The base head model may be modified by one or more of a default head models and/or other information. The base head model may be modified based on one or more of a determined correspondence value and/or sets of base values defining the default head models such that the base head model may be modified to model the appearance of the head of the user.

The default head models may define individual default head models for modeling an individual head type. The individual head type may be defined by an individual set of base values for a set of head modeling parameters. The individual default head models for modeling individual head types may include individual virtual head models with heads representative of human head characteristics. The human head characteristics may include one or more of head shapes and/or facial features. The individual head models of the individual head types may include human head characteristics with head shapes and/or facial feature with extreme feature proportions.

In a non-limiting example, individual virtual head models of the heads representative of human head characteristics with head shapes and/or facial feature with extreme feature proportions may include one or more of an extreme eye proportion, an extreme eyebrow proportion, an extreme nose proportion, an extreme mouth proportion, an extreme ear proportion, an extreme chin proportion, an extreme cheek proportion, an extreme forehead proportion, an extreme jawline proportion, an extreme head shape proportion, and/or other extreme proportion of the virtual head model of the individual default head models. For example, a first virtual head model may be a virtual head with the largest eyes on virtual head model, the smallest eyes on virtual head model, and/or any eye size in between. A second virtual head model may be a virtual head with the largest eye separation on the virtual head model, the smallest eye separation on the virtual head model, and/or any distance in between. The extreme head shapes and/or facial feature proportions may be specified by one or more of an upper and/or a lower limit of the head modeling parameters.

In some implementations, the individual default head models may modify individual head modeling parameters of the base head model. For example, a first default head model may modify the value of the eye parameter of the base head model and a second default head model may modify the value of the nose parameter of the base head model. Other modifications of other values of other parameters may also occur.

In some implementations, the individual default head models may convey information about one or more of a facial feature, a head shape, and/or other information of the individual default head models. The facial feature may include information related to the face of the individual default head models. The head shape may include information related to the head of the individual default head models.

In some implementations, the individual default head models may include individual virtual head models for facilitating animating facial movement of the base head model. The facial movement may be associated with one or more of a speech, a facial expression, and/or other facial movements. The facial movement may be conveyed by morphing the base head model with the individual default head models. The base head model may convey the current facial position and the individual default head model may convey the final facial position after a movement of the facial features. In a non-limiting example, a first default head model may have a smiling expression and/or other expressions. The first default head models may morph the base head model such that the base head model appears to be smiling. A second default head model may have a frowning expression and/or other expressions. The second default head model may morph the base head model such that the base head model appears to be frowning.

In some implementations, individual ones of one or more imaging device(s) 119 may be configured generate output signals defining image information and/or other information. The image information may include visual content present within a field-of-view of individual ones of one or more imaging device(s) 119. In some implementations, the image information defined by output signals of individual ones of one or more imaging device(s) 119 may facilitate determining user appearance information and/or other information.

The user appearance information may include one or more of user head information, user body information, and/or other information. The user appearance information may be defined by one or more of a depth information, an image information, and/or other information.

The user head information may specify the appearance of the head of a real-world user. The user head information may include visual content (e.g., images, texture maps, and/or other information) of one or more of the user's facial features, head shape, facial textures, facial expressions, and/or other visual content associated with the user's head. The visual content may be conveyed by one or more of an image, a video, and/or other visual content. The one or more of the image, the video, and/or other visual content may be defined by an array of pixels and/or other information.

The user's facial texture may specify the complexion of the user's face and/or head. The facial texture may include one or more of a color, a visual and/or tactile quality of a surface, an appearance of the skin, and/or other facial texture characteristics. The user's facial expression may include one or more of a surprised expression, a confused expression, a happiness expression, a sadness expression, an angry expression and/or other expressions of the user.

In some implementations, a feature map of the users head and/or face may be generated. The feature map may map the appearance of the head of the real-world user and/or other visual content based on the user head information and/or other information. The feature map may be one or more of a one-dimensional feature map, a two-dimensional feature map, a three-dimensional feature map, and/or other dimensional feature map. The feature map may include one or more of a set of feature points and/or other information. The set feature points may indicate one or more of a height, a width, a depth, a location, and/or other information of the appearance of the head of the real-world user and/or other visual content based on the user head information and/or other information.

In some implementations, a three-dimensional feature map may be generated. The three-dimensional feature map may be generated based on a set of two-dimensional feature maps, and/or other information. By way of non-limiting illustration, a three-dimensional feature of a face and/or head may be generated from one or more of a first two-dimensional feature map of the face and/or head, a second two-dimensional feature map of the face and/or head, and/or other information. An association between the first two-dimensional feature map and the second two-dimensional feature map may be made to generate the three-dimensional feature map. The three-dimensional feature map may specify three-dimensional positions of facial features of the human face. For example, the output signal of the first imaging device may be used to generate a first two-dimensional feature map specifying two-dimensional positions of facial features of the human face and the output signal of the second imaging device may be used to generate a second two-dimensional feature map specifying two-dimensional positions of facial features of the human face. The first imaging device may generate output signals from a first angle with respect to the user and the second imaging device may generate output signals from a second angle with respect to the user. Wherein an association between the first two-dimensional feature map information and second two-dimensional feature map information may be made to generate a three-dimensional feature map information specifying three-dimensional positions of facial features of the human face. In some implementations, individual feature points in the first two-dimensional feature map and second two-dimensional feature map may be triangulated to produce the three-dimensional feature map.

The user body information may specify the appearance of the real-world user. The user body information may be determined from the output signals conveying depth information generated by the depth sensor 120 and/or other sensors. The user body information may be determined from and/or may include the depth information. The depth information may convey range of surfaces of objects in a real-world environment. The depth information may include information of one or more of a user's body shape, a body outline, a body silhouette, and/or other information associated with the user. In some implementations, the one or more of the user's body shape, the body outline, the body silhouette, and/or other information associated with the user's body may include a set of values specifying one or more of a height, a width, a depth, and/or other values of the user's body shape, the body outline, the body silhouette, and/or other information. The user's body including one or more of a head, a torso, an arm, a leg, a hand, a food, and/or other body parts. The one or more of the user's body shape, the body outline, the body silhouette, and/or other information associated with the user's body be conveyed by one or more of an image, a video, and/or other visual content. The one or more of the image, the video, and/or other visual content may be defined by an array of pixels and/or other information.

In some implementations, individual ones of the imaging device(s) 119 may include an image sensor and/or other sensors. The image sensor may be configured to generate output signals conveying light and/or electromagnetic radiation incident on the image sensor, and/or other information. The output signals may define image information including visual content present within a field-of-view of individual ones of one or more imaging device(s) 119. In some implementations, a first imaging device including an image sensor may generate output signals defining first image information including visual content present within a field-of-view of the first imaging device. A second imaging device including an image sensor may generate output signals defining second image information including visual content present within a field-of-view of the second imaging device.

In some implementations, image information from an image sensor may define one or more of an image, a video, and/or other visual content. An image, the video, and/or other visual content may be defined by an array of pixels. The image information may be stored in one or more electronic storage 122 and/or other storage locations.

In some implementations, an image sensor may comprise of one or more of a photo sensor array (e.g., an array of photosites), a charge-coupled device sensor, an active pixel sensor, a complementary metal-oxide semiconductor sensor, an N-type metal-oxide-semiconductor sensor, and/or other image sensors. In some implementations, the information obtained by the image sensor may be stored in one or more of a non-transitional electronic storage, and/or other storage location. In a non-limiting example, an image sensor may be included in a camera of a computing platform 114 and/or other devices configured to capture images.

In some implementations, individual ones of one or more depth sensors 120 may be configured to generate output signals defining depth information and/or other information. The depth information may convey one or more of a range of surfaces of objects in a real-world environment. The depth information conveying one or more of the range of surfaces of objects in the real-world environment may include one or more of a user appearance information and/or other information. In some implementations, the depth information may include information of one or more of a user's body shape, a body outline, a body silhouette, and/or other information associated with the user. The one or more of the user's body shape, the body outline, the body silhouette, and/or other information associated with the user may be conveyed by one or more of an image, a video, and/or other visual content. The one or more of the image, the video, and/or other visual content may be defined by one or more of an array of pixels. The depth information may be stored in one or more electronic storage 122 and/or other storage locations In some implementations, an individual depth sensor may include one or more of a 3D depth sensing systems, a stereoscopic vision systems, a fixed structured light systems, a time-of flight camera system and/or other depth sensing systems. The 3D depth sensing systems may generate output signals conveying electromagnetic radiation incident on the depth sensor, and measure a phase change of the reflected signal and/or other information to generate the depth information of the user. The stereoscopic vision systems may include two or more sensors. The two or more sensors may generate output signals conveying electromagnetic radiation incident on the sensors, and measure a difference between individual sensors and/or other information to generate the depth information of the user. The fixed structured light systems may generate output signals conveying electromagnetic radiation incident on the depth sensor, and measure a distortion of the electromagnetic radiation and/or other information to generate the depth information of the user. The time-of flight camera system may generate output signals conveying electromagnetic radiation incident on the depth sensor, and measure a distance the electromagnetic radiation traveled and/or other information to generate the depth information of the user. The examples of the depth sensing systems described above is for illustrative purposes and is not intended to be limiting.

In some implementations, the surfaces of objects in a real-world environment may be surfaces of the user. The surfaces of the user may include surfaces of one or more of the user's body, the user's head, and/or other surfaces. The surfaces of the user's body may include a surface of one or more of an arm, a leg, a torso, a lower body, a head, and/or other surfaces of the user. The surfaces of the user's head may include a surface of one or more of a face, a head, and/or other surfaces of the user. In some implementations, the surfaces of the user may be defined by one or more surface parameters and/or other information. The values of surface parameters may specify the dimensions of surfaces of the user. A set of values of the surface parameters for a given user may specify one or more of a height, a width, a depth, and/or other values defining dimensions of surfaces on the user. The set of values of the surface parameters may be determined based on the depth information and/or other information. In a non-limiting example, a width of a first surface may be specified by a value of a first surface parameter. The value of the first surface parameter may be determined by a pixel distance. The pixel distance may be the distance between a first pixel present on a first location of the first surface and a second pixel present on a second location of the first surface.

In some implementations, one or more of the imaging device(s) 119, one or more of the depth sensor 120, and/or other devices and/or sensors may be positioned adjacent to one another. In a non-limiting example, a first imaging device and/or a second imaging device may be positioned side by side along a horizontal axis and/or along another axis. The depth sensor 120 may be positioned above and/or below the first imaging device and/or second imaging device. In a non-limiting example, the first imaging device and second imaging device may be positioned side by side along the vertical axis and/or along another axis. The depth sensor 120 may be positioned along the side of the first imaging device and/or second imaging devices. In a non-limiting example, the second imaging device may be positioned below the first imaging device, and the depth sensor 120 may be position below the second imaging device (see, e.g., FIG. 2).

In some implementations, one or more of the imaging device(s) 119, one or more depth sensors 120, and/or other devices and/or sensors may be positioned one or more distances from the user. For example, the first imaging device may be positioned at a first distance from the user, the second imaging device may be positioned at a second image distance from the user, and the depth sensor 120 may be positioned at a third distance from the user. The first imaging device and second imaging device may be positioned at a fourth distance from the user, and the depth sensor 120 may be positioned at a fifth distance from the user. In a non-limiting example, the depth sensor 120 may be positioned 1.9 meters in front of the user, and the first imaging device and the second imaging device may be positioned at 2 meters in front of the user.

In some implementations, one or more of the imaging device(s) 119, one or more of the depth sensors 120, and/or other devices and/or sensors may be positioned at one or more heights relative to the ground. In a non-limiting example, the first imaging device may be positioned at a first height relative to the ground, the second imaging device may be positioned at a second height relative to the ground, and the depth sensor 120 may be positioned at a third height relative to the ground. In some implementations, the first imaging device and the second imaging device may be positioned at the first height relative to the ground, and the depth sensor 120 may be positioned at the second height relative to the ground. In some implementations, the depth sensor 120 may be positioned at a height of a torso of an average human (e.g., 50th percentile human torso height and/or other height). The first imaging device and the second imaging device may be positioned at a height of a head of an average human. The first imaging device and the second imaging device may be positioned such that the first field of view of the first imaging device and the second field of view of the second imaging device captures one or more of the user head information, the user body information, and/or other information. The depth sensor 120 may be positioned such that the third field of view of the depth sensor 120 captures one or more of the user head information, user body information, and/or other information. In a non-limiting example, the depth sensor 120 may be positioned 1 meter above ground, the first imaging device may be positioned 1.63 meters above ground, and the second imaging device may be positioned 1.38 meters above ground. The depth sensor 120 may capture user body information and/or head information. The depth sensor 120 may capture user body information and/or head information based on a single capture of information by depth sensor 120. The first imaging device and the second imaging device may capture user head information and/or other information. In some implementations, the user head information and/or other information may be captured based on single image captures by both the first imaging device and the second imaging device.

In some implementations, there may be one or more light boxes configured to highlight the user. The one or more light boxes may be one or more light sources directed toward the user. A given light box may illuminate the user.

In some implementations, the user may stand in front of the one or more imaging device(s) 119 and/or the one or more depth sensor 120 in one or more poses. The one or more poses may include one or more of having the hands along the side of the body, having the hands above the head, being in a T-pose, and/or other poses. The user may be standing with the user's front body facing toward with the imaging device(s) 119 and/or the depth sensor 120. The user may be standing with the user's side body facing toward with the imaging device(s) 119 and/or the depth sensor 120.

In some implementations, a computing platform 114 may include one or more sensors and/or other components. Sensors may be configured to obtain one or more of the image information, the depth information, and/or other information. Sensors may include one or more of an image sensor, a depth sensor 120, and/or other sensors. Information obtained by the sensors may be stored in one or more of a non-transitional electronic storage 122, and/or other storage location. The computing platform may be one or more of a smartphone, a computing device, and/or other platforms configured to obtain one or more of the image information, the depth information, and/or other information for generating virtual entities representing real-world users.

The image component 104 may be configured to obtain the one or more of the output signals and/or other information from the one or more of the one or more imaging device(s) 119, depth sensor 120, and/or other sensors, devices, and/or storage locations. The image component 104 may determine and/or obtain the user appearance information and/or other information from output signals. The image component 104 may determine and/or obtain the user appearance information and/or other information from the one or more computing platform, electronic storage, and/or storage locations. The image component 104 may determine and/or obtain the user head information. The image component 104 may determine and/or obtain the user body information.

In some implementations, image component 104 may determine the user's gender from the user appearance information. The user's gender may be defined by one or more values for a user gender parameter. The set of values for the user gender parameter may be determined based on the user body information. A first value for the user gender parameter may specify a gender. A confidence of the specified gender may be determined. The user gender parameter may be determined by using one or more of a machine learning techniques and/or other techniques. Machine learning techniques may include one or more of a convolutional neural network, a decision tree learning technique, a supervised learning technique, an unsupervised learning technique, a semi-supervised learning technique, a reinforcement learning technique, a deep learning technique, and/or other techniques. Machine learning techniques may include classification techniques and/or other techniques. Classification techniques may include one or more of a statistical classification techniques and/or other techniques. Statistical classification techniques may include one or more of a linear classifier, a support vector machines, a quadratic classifier, a kernel estimation, and/or other techniques.

In some implementations, the user body information may include a set of values for a set of torso parameters and a value for a height parameter. The torso parameters may include one or more of a width parameter, a depth parameter, and/or other parameters. The values for the torso parameters may specify one or more of a width of a torso (e.g., for the width parameter), a depth of a torso (e.g., for the depth parameter), and/or other information about a torso of the user at a given height. Other information considered may include values of a focal length parameter specifying a focal length of one or more of the depth sensor 120, imaging device 119 and/or other sensors. The depth may be based on the measurements obtained from the depth sensor 120 and/or other sensors. In some implementations, an average depth of the user may be determined. A torso parameter may include the average depth and/or other information. The width of the user torso may be determined by the pixel distance of pixels conveying information of the user's torso. The height may be the overall height, or percentage of the height, of the user. The height of the user may be determined by the pixel distance of pixels conveying information of the user's height (e.g., a pixel distance between a pixel at a user's foot and a pixel at the top of a user's head).

In some implementations, the user body information may include a first set of values for a first set of torso parameters that may be associated with a first value for a height parameter. For example, the first set of values may specify dimensions of a torso at a given height specified by the first value of the height parameter. The first set of values for the first set of torso parameters may include one or more of a first value for a width parameter, a second value for a depth parameter, and/or other information. A third value for a focal length parameter may also be considered. The user body information may include a second set of values for the first set of torso parameters and a second value for the height parameter. The second set of values for the first set of torso parameters may be associated with the second value for the height parameter. The second set of values for the first set of torso parameters may be associated with the second value for the height parameter. The second set of values for the first set of torso parameters include one or more of a fourth value for the width parameter, a fifth value for the depth parameter, and/or other information. A six value for a focal length parameter may be considered. The user body information may include a third set of values for a first set of torso parameters and a third value for the height parameter. The third set of values for the first set of torso parameter may be associated with the third value for the height parameter. The third set of values for the first set of torso parameters include one or more of a seventh value for the width parameter, an eighth value for the depth parameter, and/or other information. A ninth value for a focal length parameter may be considered. In some implementations, the focal length may be fixed such that the third value, sixth value, and/or ninth value for the focal length parameter may be the same value.

In some implementations, the body component 106 may be configured to generate a virtual body of a virtual entity representative of the body of the real-world user. The body component 106 may be configured to determine correspondence values conveying correspondences between the appearance of the user's body and individual ones of the default body models. The body component 106 may generate the body of the virtual entity representing the real-world user based on the determined correspondence values by modifying the set of values defining the base body model based on determined correspondence values and the sets of base values defining the default body models such that the base body model may be modified to model the appearance of the body of the user.

In some implementations, there may be individual correspondence values for the individual default body models. For example, a first default body model may have a first correspondence value and/or a second default body model may have a second correspondence value. The first correspondence value and/or second correspondence value may be determined independently. The first correspondence value may convey correspondences between the appearance of the body of the user and the first default body model. The second correspondence value may convey correspondences between the appearance of the body of the user and the second default body model.

In some implementations, the body component 106 may obtain the user body information and/or other information from the image component 104, the non-transitory electronic storage 122, and/or other components to determine one or more of the correspondence values conveying correspondences between the appearance of the user's body and the individual default body models.

In some implementations, correspondence values may be determined based on one or more of a user body dimension ratio, a base body model dimension ratio, a default body model dimension ratio, and/or other values. The correspondence values may be determined based on relationships between the user body dimension ratio, the base body model dimension ratio, the default body model dimension ratio, and/or other values. In some implementations, the relationships between the user body dimension ratio, the base body model dimension ratio, the default body model dimension ratio, and/or other values may be one or more of a difference, a ratio, a correlation, and/or other relationship between the one or more values. In a non-limiting example, the correspondence values may be determined by comparing the ratio of the difference between the user body dimension ratio to the base body model dimension ratio and the difference between the default body model dimension ratio to the base body model dimension ratio. In a non-limiting example, a correspondence value may be determined by the equation:

$$\text{Correspondance Value} = \frac{\text{user body dimension ratio} - \text{base body model dimension ratio}}{\text{default body model dimension ratio} - \text{base body model dimension ratio}}$$

In some implementations, the user body dimension ratio may specify a relationship between sets of values of the surface parameters and/or other information. By way of non-limiting illustration, the user body dimension ration may specify a relationship between one or more of a height, a width, a depth, a focal length, and/or other values of the surface parameter, depth information, and/or other information. The relationship between set of values of the surface parameter may be one or more of a difference, a ratio, a correlation, and/or other relationship between one or more the height, the width, the depth, the focal length, and/or other values of the surface parameter.

In a non-limiting example, a user body dimension ratio may be a ratio between a value specifying the depth multiplied by a value specifying the width over a value specifying the focal length over a height. The user body dimension ratio may be summarized by the equation:

$$\text{User body dimension ratio} = \frac{\frac{\text{depth} * \text{width}}{\text{focal length}}}{\text{Height}}$$

In non-limiting example, a user body dimension ratio may be a ratio between a value specifying the width over a height. The examples described above is for illustrative purposes and is not intended to be limiting.

In some implementations, the user body dimension ratio may be one or more of a relationship between the sets values of the human body silhouette, depth information, and/or other information. The sets values of the human body silhouette may be referred to as user's body measurement values. In some implementations, the relationships between the user's body measurement values may be one or more of a difference, a ratio, a correlation, and/or other relationship between one or more values of the height, the width, the depth, the focal length, and/or other values of the human body silhouette.

In a non-limiting example, a first correspondence value may be determined based on the first set of values for the first set of torso parameter and the first value for the first height parameter. A second correspondence value may be determined based on the second set of values for the second set of torso parameter and the second value for the second height parameter. A third correspondence value may be determined based on the third set of values for the third set of torso parameter and the third value for the third height parameter.

In a non-limiting example, a first correspondence values may be determined based on one or more of a user body dimension ratio, a base body model dimension ratio, a default body model dimension ratio, and/or other values. In some implementations, the user body dimension ratio may be one or more of a relationship between set of values the torso parameter, the values for the height parameter, and/or other parameters. The relationships between the set of values the torso parameter, the values for the height parameter, and/or other parameters may be one or more of a difference, a ratio, a correlation, and/or other relationship between one or more of the set of values the torso parameter, the values for the height parameter, and/or other parameters. In a non-limiting example, the user body dimension ratio may be a relationship between a first value for the width parameter, a second value for the depth parameter, a third value for the focal length parameter, and a first value for the height parameter. The relationship may be the value of the first value for the torso width parameter multiplied by the second value for the depth parameter over the third value for the focal length parameter over the first value for the height parameter.

In some implementations, the default body model dimension ratio may be one or more of a relationship between the individual set of base values for the set of body modeling parameters. The individual set of base values for the set of body modeling parameters may be referred to as default body model measurement values. The relationships between the default body model measurement values may be one or more of a difference, a ratio, a correlation, and/or other relationship between one or more values of the height, the width, the depth, the location, the focal length, and/or other values of the set of body modeling parameters.

In some implementations, the base body model dimension ratio may be one or more of a relationship between the individual set of values for the set of body modeling parameters. The individual set of values for the set of body modeling parameters may be referred to as base body model measurement values. The relationships between the base body model measurement values may be one or more of a difference, a ratio, a correlation, and/or other relationship between one or more values of the height, the width, the depth, the location, the focal length, and/or other values of the set of body modeling parameters.

In some implementations, the one or more correspondence value may be determined by one or more of a machine learning technique and/or other techniques. Machine learning techniques may include one or more of a convolutional neural network, a decision tree learning technique, a supervised learning technique, an unsupervised learning technique, a semi-supervised learning technique, a reinforcement learning technique, a deep learning technique, and/or other techniques. Machine learning techniques may include classification techniques, regression techniques, and/or other techniques. Classification techniques may include one or more of a statistical classification techniques and/or other techniques. Statistical classification techniques may include one or more of a linear classifier, a support vector machines, a quadratic classifier, a kernel estimation, and/or other techniques. Regression techniques may include one or more of a Linear regression, Logistic regression, Polynomial regression, Stepwiser regression, Ridge regression, Lasso regression, ElaticNet regression, and/or other regression techniques.

In some implementations, the base body model may be modified based on the correspondence values and default body models such that the base body model resembles the user's body. The base body model may be morphed based on the individual default body models. The body component 106 may modify the set of values defining the base body model based on determined correspondence values and the sets of base values defining the default body models such that the base body model may be modified to model the appearance of the head of the body.

In some implementations, the correspondence values may specify a weight and/or influence individual default body models have in the modification/morphing of the base body model. By way of non-limiting illustration, the correspondence values may range between zero to one. In a non-limiting example, a first correspondence values for a first default body model may have the value V1. A second correspondence values of a second default body model may have a value V2. The value V1 and the value V2 may range between zero and one. The value V1 may specify the how much the base body model may be modified to look like the first default body model (e.g. the base may look V1 percent like the first default body model). The value V2 may specify the how much the base body model may be modified to look like the second default body model (e.g. the base may look V2 percent like the second default body model). In a non-limiting example, the base body model may be modified to appear 50% like the first default body model and/or 90% like the second default body model. A sum of the modification of the base body model by the default body models may result in a modified base body model that resembles the appearance of the body of the user.

In some implementations, the individual default body models may include a female body model. The gender of the real-word user may be determined based on the image information and/or depth information, wherein the base body model may be modified/morphed based on the determined gender of the real-word user. Based on the determined user gender by machine learning technique and/or other techniques, the base body model may be modified to resemble the female body model.

In some implementations, the head component 108 may be configured to generate a virtual head of a virtual entity representative of the head of the real-world user. The head component 108 may be configured to determine correspondence values conveying correspondences between the appearance of the user's head and individual ones of the default head models. The head component 108 may generate the head of the virtual entities representing real-world users based on the correspondence values by modify the set of values defining the base head model based on determined correspondence values and the sets of base values defining the default head models such that the base head model may be modified to model the appearance of the head of the user.

In some implementations, there may be individual correspondence values for individual default head models. For example, a first default head model may have a first correspondence value and/or a second default head model may have a second correspondence value. The first correspondence value and the second correspondence value may be determined independently. The first correspondence value may convey correspondences between the appearance of the user's head and the first default head model. The second correspondence values convey correspondences between the appearance of the head and the second default head model.

In some implementations, the head component 108 may obtain one or more of the user head information, individual default head model information, base head model information, and/or other information from one or more of the image component 104, the non-transitory electronic storage 122, and/or other components to determine one or more of the correspondence value conveying correspondences between the appearance of the head and/or face of the user and default head models.

In some implementations, the correspondence values may be determined based on the one or more of the feature maps of the user head, individual default head models, base head models, and/or other information. The feature map of the user's head may be referred to as a user feature map. The feature map of the default head models may be referred to as a default head model feature map. The feature map of the base head models may be referred to as a base head model feature map.

In some implementations, the individual correspondence values may be determined by the proportions of the one or more head shapes and/or facial feature of the individual default head models for modifying the set of values defining the base head model. In a non-limiting example, a first correspondence value determined based on a first default head model with the value 0.1 may represent the first default head model with a smaller nose proportion may be used on modify the base head model. The first correspondence value determined based on the first default head models with the value 0.9 may represent the first default head model with a larger nose proportion may be used on modify the base head model. A second correspondence value determined based on a second default head model with the value 0.1 may represent the second default head model with a smaller mouth proportion may be used on modify the base head model. The second correspondence value determined based on the second default head model with the value 0.9 may represent the second default head model with a larger mouth proportion may be used on modify the base head model.

In some implementations, the correspondence values may be determined by a comparison between the appearance (e.g., via feature maps) of the user's head and the appearance of the default head models. The correspondence values may be determined by selecting correspondence values that minimizes the differences between the appearance of the user's head and the default head models.

In some implementations, the differences between the appearance of the user's head and the default head models may be determined by comparing the user feature map with the default head model feature map. The correspondence values may be determined based on the differences between the feature points of the user feature map and the default head model feature map. The set of feature individual points of the user feature map may be compared with the set of individual feature points of the default head model feature map to determine the differences between the feature points of the facial features.

In some implementations, a sum of the distances between the set of individual points of the user feature map and the set of the default head model feature map may be determined. The correspondence value may be selected to minimize the sum of the distances. The correspondence values that minimizes the sum of the distances may be determined by solving one or more of a linear and/or non-linear equations and/or by other techniques, algorithms, and/or methods. The correspondence values that minimizes the sum of the distances may be determined using one or more of a Least-Squares method, an Energy Minimization techniques, a Loss Reduction techniques, a Levenberg Maquardt algorithm, a Euclidean Distance Minimization techniques, and/or other techniques, algorithms, and/or methods.

In some implementations, the base head model may be modified based on the correspondence values and default head models such that the base head model resembles the user's head and/or face. The base head model may be modified/morphed based on the individual default head models. The head component 108 may modify the set of values defining the base head model based on determined correspondence values and the sets of base values defining the default head models such that the base head model may be modified to model the appearance of the head of the user. A sum of the modification of the base head model by the individual default head models may result in a modified base head model that resembles the appearance of the head of the user.

In some implementations, the body component 106 and the head component 108 may be used to generate parts of virtual entities representing real-world users. The body component 106 may generate the virtual body for the virtual entity and/or the head component 108 may generate the virtual head for the virtual entity. In some implementations, the virtual head of the virtual entity may be generated first followed by the virtual body of the virtual entity. In some implementations, the virtual body of the virtual entity may be generated first followed by the virtual head of the virtual entity. In some implementations, the virtual head of the virtual and virtual body of the virtual entity may be generated at the same time.

In some implementations, a user's face texture information defining a face texture of the user may be mapped onto the face of the virtual head of the virtual entity generated by the head component 108. The user's face texture information may be an image of the user's face. The face texture information may be mapped onto the face of the virtual head based on the feature map of the virtual head of the virtual entity and/or the feature map of the user's face texture. The user's face texture information may be obtained from the output signals of the one or more imaging device(s) 119. The user's face texture information used to map onto the face of the virtual head may be selected based on the user's head orientation relative to the one or more imaging device(s) 119. The user's head orientation may be determined by the feature map of the user's head based on the one or more imaging device(s) 119.

The user's face texture information may be modified such that the image consists only of information of the user's face. The user's face texture information may include a feature map specifying the location of facial features. The user's face texture information may be mapped onto a virtual head model. The user's face texture information may be mapped onto a virtual head model based on the feature map of the virtual head model and the user's face texture information. The user's face texture information may be mapped onto a virtual head model such that the differences between feature points of the feature map is minimized. The user's face texture information may be mapped onto a virtual head model such that the facial features of the user's face texture information may be mapped onto a virtual head model. The user's face texture information may be mapped onto a virtual head model may morphing/modifying the user's face texture information to fit onto the virtual head model.

In some implementations, user's face texture information individual facial features of the user's face texture information may be mapped onto the virtual head model separately. For example, the user's face texture information corresponding the eyes may be mapped onto the virtual head model separate from the user's face texture information corresponding the face. In a non-limiting example, the user's face texture information corresponding the eyes may be mapped into the virtual head model first, followed by the user's face texture information corresponding the face.

In some implementations, the user's face texture information may be may be modified. The user's face texture information modified to remove imperfections. The user's face texture information modified to enhance a quality. The user's face texture information modified to more closely resemble the user.

Figure 2:
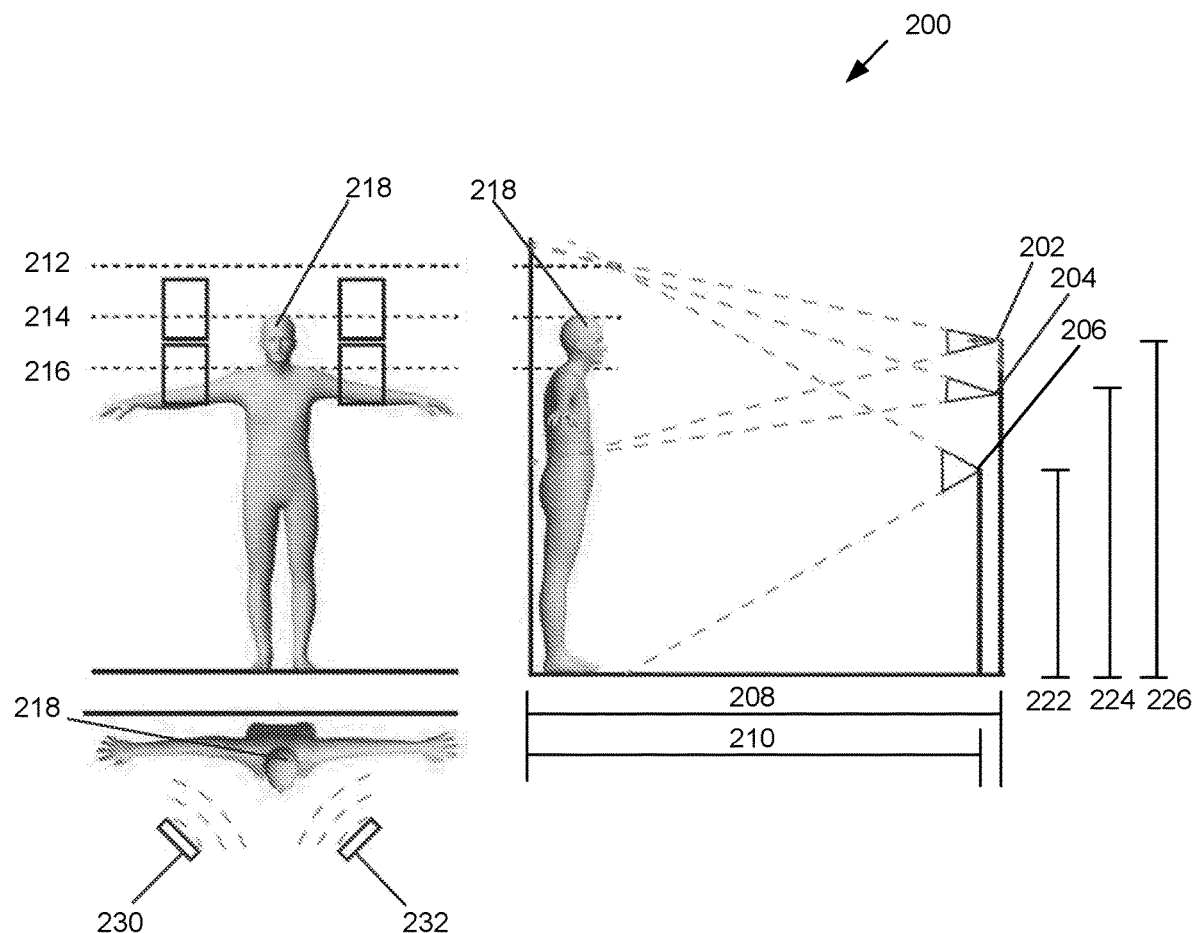
FIG. 2 illustrates an exemplary graphic of a user's position in relationship to a first imaging device, second imaging device, and depth sensor.

By way of non-limiting illustration, FIG. 2 includes a depiction of a user 218 standing in a T-pose in front of a first imaging device 202, a second image device 204, and a depth sensor 206. FIG. 2 also includes a depiction an implementation of the position of the first imaging device 202, a second image device 204, and a depth sensor 206. The first imaging device 202 and second image device 204 may be the imaging device(s) 119 shown in FIG. 1 and described herein. The depth sensor 206 may be the depth sensor 120 shown in FIG. 1 and described herein. The first imaging device 202, the second image device 204, and the depth sensor 206 may facilitate generating user appearance information. The height 212 may indicate a first height. The height 214 may indicate a second height. The height 216 may indicate a third height. In a non-limiting example, the height 212 may be 2 meters; the height 214 may be 1.75 meters; and the height 216 may be 1.5 meters. The distance 208 may indicate the distance between the user 218 and the imaging device 202 and/or the imaging device 204. The distance 210 may indicate the distance between the user 218 and the depth sensor 206. In a non-limiting example, the distance 208 may be 2 meters. In a non-limiting example, the distance 210 may be 1.9 meters. The height 226 may indicate the height of imaging device 202 relative to the ground. The height 224 may indicate the height of imaging device 204 relative to the ground. The height 222 may indicate the height of depth sensor 206 relative to the ground. In a non-limiting example, the height 226 may be 1.63 meters; the height 224 may be 1.38 meters; and the height 222 may be 1 meter. Light box 230 and light box 232 may be positioned to provide lighting. In some implementations, light box 230 and light box 232 may be positioned to highlight the user 218's appearance.

Figure 3:
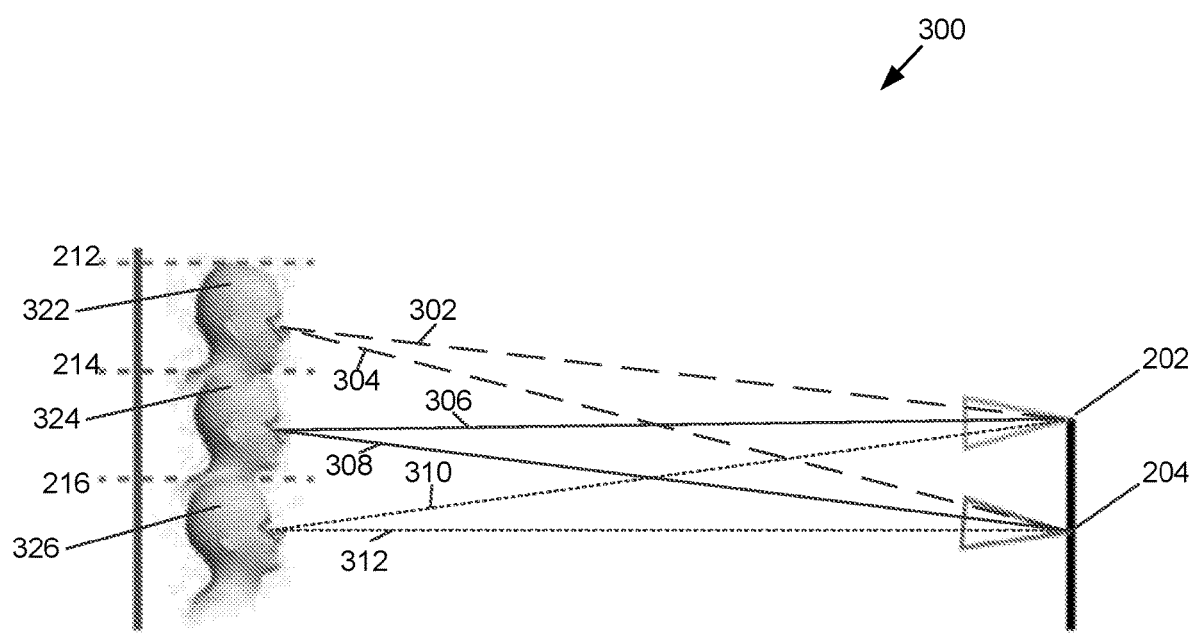
FIG. 3 illustrates an exemplary graphic of a user head's position in relationship to a first imaging device and second imaging device.

By way of non-limiting illustration, FIG. 3 includes a depiction of the positions of the head of user 218 relative to the first imaging device 202 and the second image device 204. Head 322, head 324, and head 326 may individually represent user heads. The top of the head 322 may be positioned at height 212. The top of the head 324 may be positioned at height 214. The top of the head 326 may be positioned at height 216.

In some implementations, the position 302 may indicate the position of the head 322 relative to the imaging device 202. Position 304 may indicate the positioned of the head 322 relative to the imaging device 204. Position 306 may indicate the positioned of the head 324 relative to the imaging device 202. Position 308 may indicate the positioned of the head 324 relative to the imaging device 204. Position 310 may indicate the position of the head 326 relative to the imaging device 202. Position 312 may indicate the positioned of the head 326 relative to the imaging device 204.

In some implementations, the position 302 may indicate an angle of the head 322 relative to the imaging device 202. Position 304 may indicate an angle of the head 322 relative to the imaging device 204. Position 306 may indicate an angle of the head 324 relative to the imaging device 202. Position 308 may indicate an angle of the head 324 relative to the imaging device 204. Position 310 may indicate an angle of the head 326 relative to the imaging device 202. Position 312 may indicate an angle of the head 326 relative to the imaging device 204. For example, an average adult with a height between 1.5 meters and 2 meters may have a position indicating an angle of the adult head relative to an imagining device that range between positive 6 degrees and negative 6 degrees.

The user's face texture information used to map onto the face of the virtual head may be selected based on the user's head orientation relative to the one or more imaging device 202, imaging device 204, and/or other devices. The user's head orientation may be determined by the feature map of the user's head based on output signals of one or more of imaging device 202, imaging device 204, and/or other devices. The user's head orientation may be based on the angle of the head 322, head 324, and/or head 326 relative to imaging device 202 and/or imaging device 204.

Figure 4:
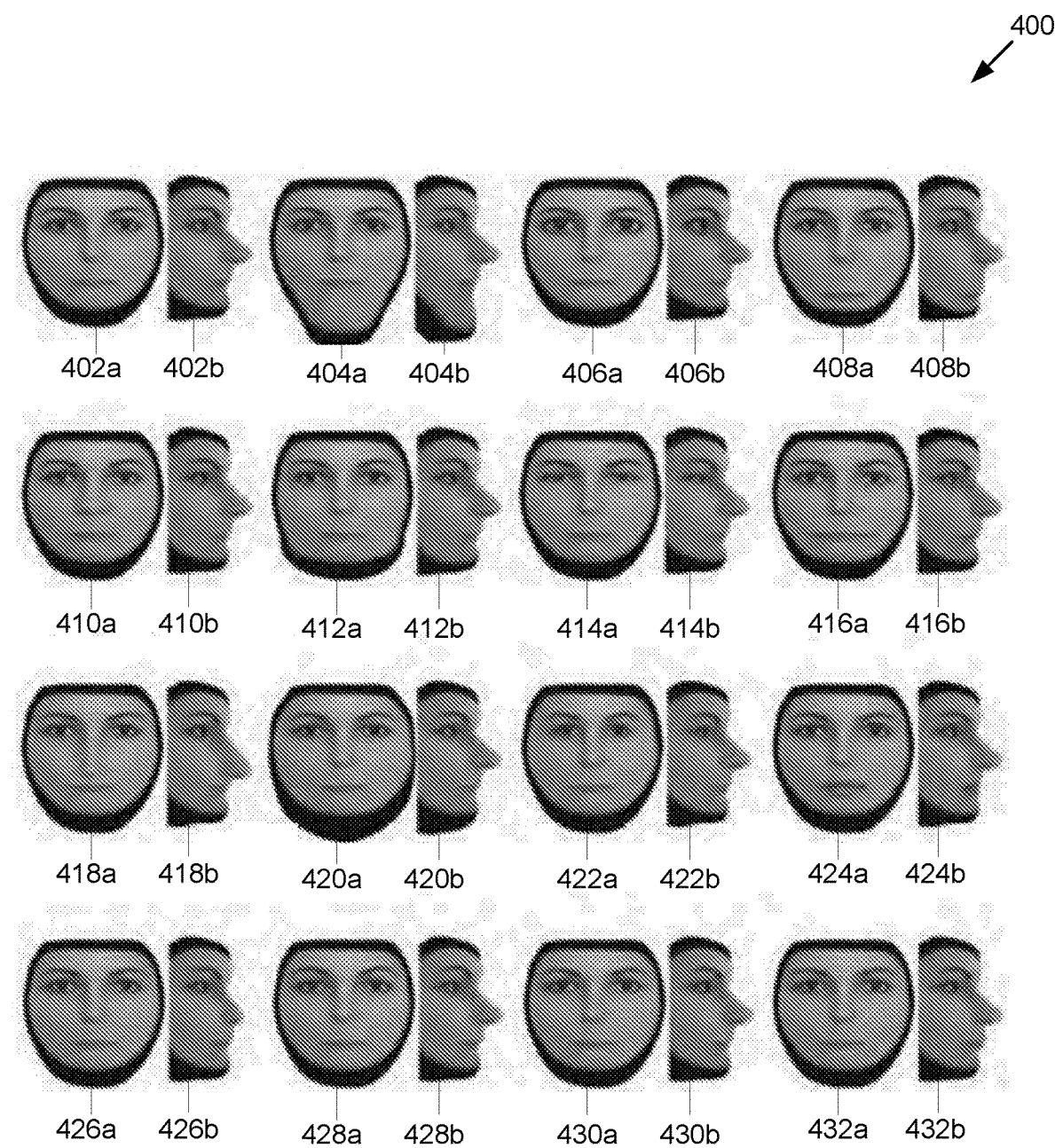
FIG. 4 illustrates an exemplary graphic of default head models used for modifying a base head model such that a base head model models appearance of a head of a user.

By way of non-limiting illustration, FIG. 4 includes a depiction of one or more default head models and a base head model. The depiction of default head models and the base head model includes a front view of the default head model label "a" and the side view of a head model label "b". Base head model 402a and Base head model 402b may be the virtual head model of the generic human head. In some implementations, the head component 108 may modify the set of values defining the base head model 402a based on determined correspondence values and the sets of base values defining the default head models such that the base head model 402a may be modified to model the appearance of the head of the user 218.

In some implementations, default head model 404a and default head model 404b may be an individual default head model with head shapes and/or facial feature with one or more extreme feature proportions. The head shapes and/or facial feature with extreme feature proportion may be the jaw's vertical position. Default head model 406a and default head model 406b may be an individual default head model with a head shapes and/or facial feature with extreme feature proportion. The head shapes and/or facial feature with extreme feature proportion may be the eye size. Default head model 408a and default head model 408b may be an individual default head model with a head shapes and/or facial feature with extreme feature proportion. The head shapes and/or facial feature with extreme feature proportion may be the mouth vertical position.

Default head model 410a and default head model 410b may be an individual default head model with a head shapes and/or facial feature with extreme feature proportion. The head shapes and/or facial feature with extreme feature proportion may be the nose width position. Default head model 412a and default head model 412b may be an individual default head model with a head shapes and/or facial feature with extreme feature proportion. The head shapes and/or facial feature with extreme feature proportion may be the jaw's square position. Default head model 414a and default head model 414b may be an individual default head model with a head shapes and/or facial feature with extreme feature proportion. The head shapes and/or facial feature with extreme feature proportion may be the eye vertical position. Default head model 416a and default head model 416b may be an individual default head model with a head shapes and/or facial feature with extreme feature proportion. The head shapes and/or facial feature with extreme feature proportion may be the mouth width position.

Default head model 418a and default head model 418b an individual default head model with a head shapes and/or facial feature with extreme feature proportion. The head shapes and/or facial feature with extreme feature proportion may be the nose vertical position. Default head model 420a and default head model 420b may be an individual default head model with a head shapes and/or facial feature with extreme feature proportion. The head shapes and/or facial feature with extreme feature proportion may be the face width position. Default head model 422a and default head model 422b may be an individual default head model with a head shapes and/or facial feature with extreme feature proportion. The head shapes and/or facial feature with extreme feature proportion may be the eye separation distance. Default head model 424a and default head model 424b may be an individual default head model with a head shapes and/or facial feature with extreme feature proportion. The head shapes and/or facial feature with extreme feature proportion may be the mouth thickness.

Default head model 426a and default head model 426b may be an individual default head model with a head shapes and/or facial feature with extreme feature proportion. The head shapes and/or facial feature with extreme feature proportion may be the nose depth. Default head model 428a and default head model 428b may be an individual default head model with a head shapes and/or facial feature with extreme feature proportion. The head shapes and/or facial feature with extreme feature proportion may be the eyebrow position. Default head model 430a and default head model 430b may be an individual default head model with a head shapes and/or facial feature with extreme feature proportion. The head shapes and/or facial feature with extreme feature proportion may be the eye depth. Default head model 432a and default head model 432b may be an individual default head model with a head shapes and/or facial feature with extreme feature proportion. The head shapes and/or facial feature with extreme feature proportion may be the mouth volume.

Figure 5:
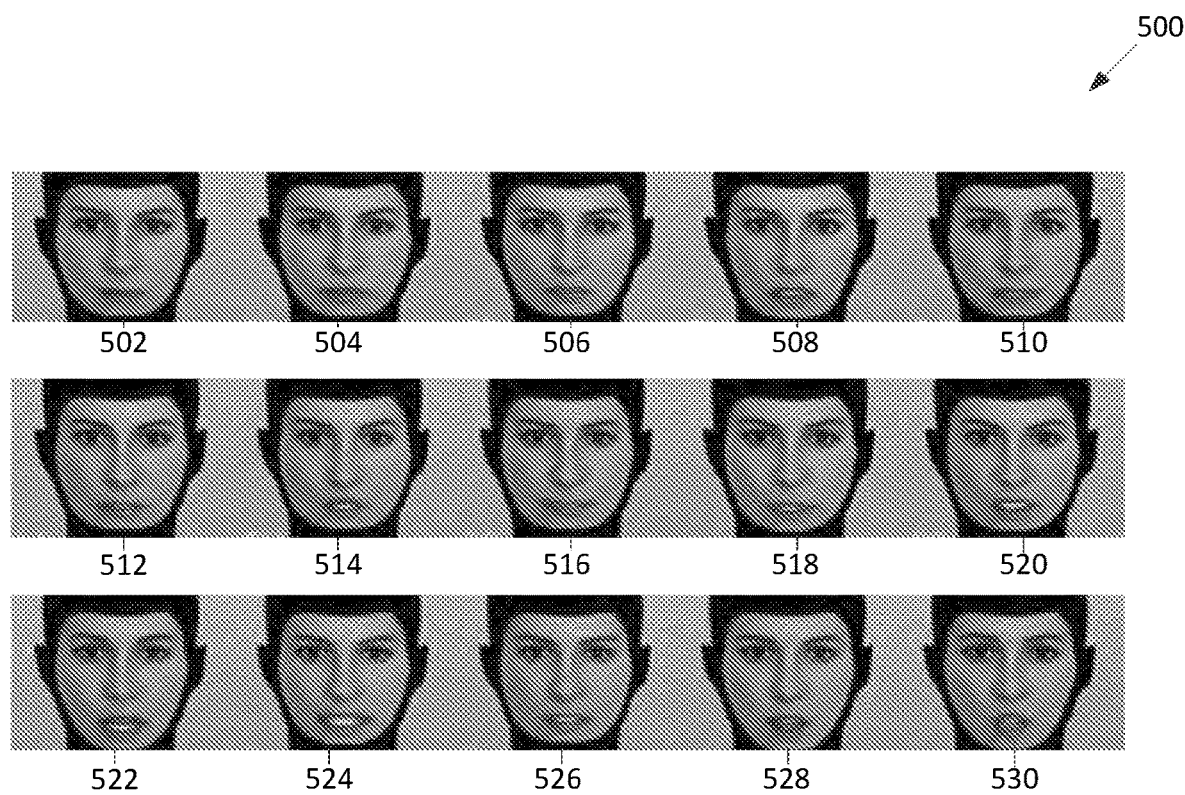
FIG. 5 illustrates an exemplary graphic of default head models used for modifying a base head model such that a base head model models a facial animation.

By way of non-limiting illustration, FIG. 5 includes a depiction of default head models 500. The default head models 500 may be used to animate expression of the user's face by modifying the base head model with the default head models. Default head model 502 may be an individual default head model with a first facial expression. Default head model 504 may be an individual default head model with a second facial expression. Default head model 506 may be an individual default head model with a third facial expression. Default head model 508 may be an individual default head model with a forth facial expression. Default head model 510 may be an individual default head model with a fifth facial expression. Default head model 512 may be an individual default head model with a sixth facial expression. Default head model 514 may be an individual default head model with a seventh facial expression. Default head model 516 may be an individual default head model with an eighth facial expression. Default head model 518 may be an individual default head model with a ninth facial expression. Default head model 520 may be an individual default head model with a tenth facial expression. Default head model 522 may be an individual default head model with a seventh facial expression. Default head model 524 may be an individual default head model with a twelfth facial expression. Default head model 526 may be an individual default head model with a thirteenth facial expression. Default head model 528 may be an individual default head model with a fourteenth facial expression. Default head model 530 may be an individual default head model with a fifteenth facial expression. The default head models may be used to animate facial movements associated with speech and/or other facial movements.

Figure 6:
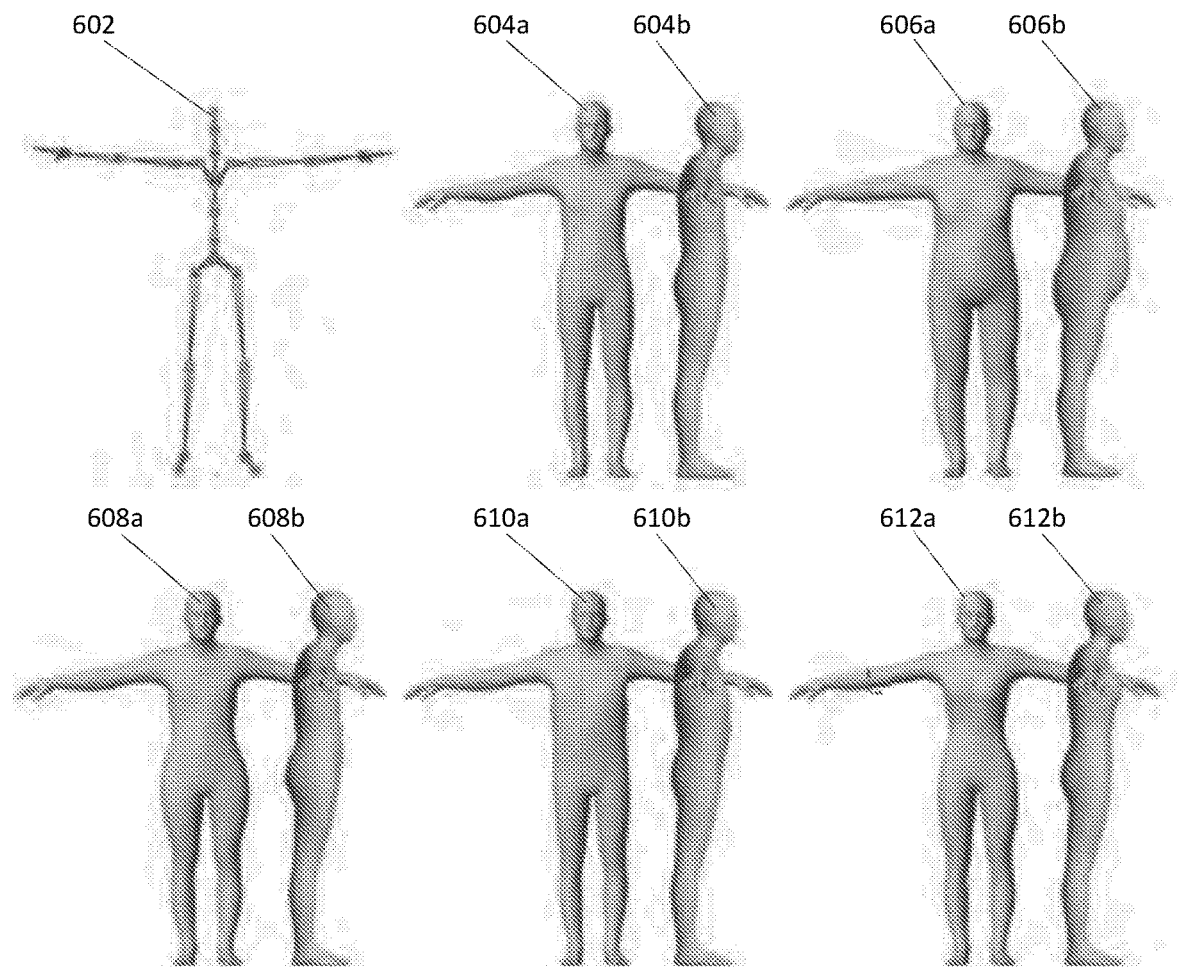
FIG. 6 illustrates an exemplary graphic of default body models used for modifying a base body model such that a base body model models appearance of a base body model.

By way of non-limiting illustration, FIG. 6 includes a depiction of default body models, a base body model 604a, and a skeleton model 602. The depiction of default body models and the base body model 604a includes a front view of a body model label "a" and a side view of a body model label "b". The base body model 604a may be include a skeleton model 602. The skeleton model 602 may be coupled with the base body model 604a. The skeleton model 602 may be configured to facilitate animating movement of the base body model 604a.

In some implementations, base body model 604a may be a virtual body model of a generic male. A generic male body type may be an average body type of an average human. A generic body type may be one or more of an endomorph body, mesomorph body, and/or ectomorph body. The base body model 604b may be a side view of the default body model 604a. In some implementations, the body component 106 (FIG. 1) may modify the set of values defining the base body model 604a based on determined correspondence values and the sets of base values defining the default body models such that the base body model 604a may be modified to model the appearance of the body of a user.

The default body model 606a may depict a big bone body shape. The default body model 606b may depict a side view of the default body model 606a. The default body model 608a may depict a reverse pear body shape. The default body model 608b may depict a side view of the default body model 608a. The default body model 610a may depict a pear body shape. The default body model 610b may depict a side view of the default body model 610a. The default body model 612a may depict a female body shape. The default body model 612b may depict a side view of the default body model 612a.

Figure 7:
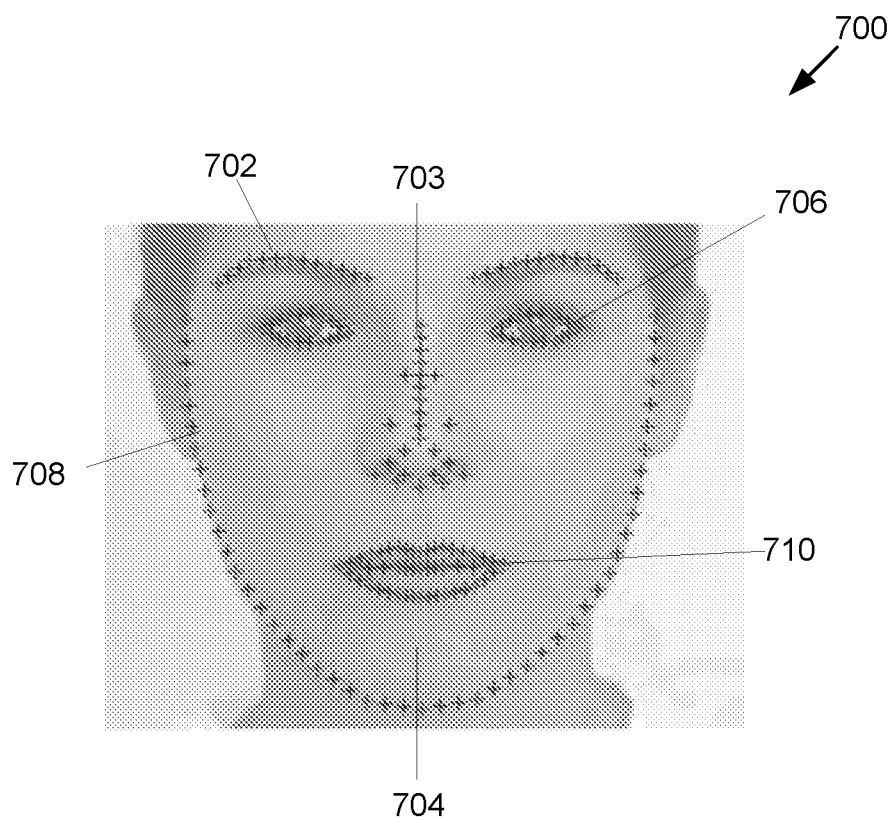
FIG. 7 illustrates an exemplary graphic of a two-dimensional feature map specifying two-dimensional positions of facial features of a user's face.

By way of non-limiting illustration, FIG. 7 includes a depiction a two-dimensional feature map 700 specifying two-dimensional positions of facial features of a user's face 704. The user's face 704 may belong to user 218 (FIG. 2). The two-dimensional feature map feature map of the user's face 704 may be determined based on the information obtained from the imaging device 202, imaging device 204, and/or other locations (shown in FIG. 2 and described herein). Feature points 702 includes sets of points that indicate the positions of the user's eyebrow. Feature points 703 includes sets of points that indicate the positions of the user's nose. Feature points 706 includes sets of points that indicate the positions of the user's eye. Feature points 708 includes sets of points that indicate the positions of the user's face shape. Feature points 710 includes sets of points that indicate the positions of the user's mouth. In some implementations, the default head models may have feature maps defined by similar information. The feature maps of the default head models may specify two-dimensional positions of facial features of the default head models. In some implementations, the base head model may have a feature map defined by similar information. The feature map of the base head model may specify two-dimensional positions of facial features of the base head model.

Figure 8:
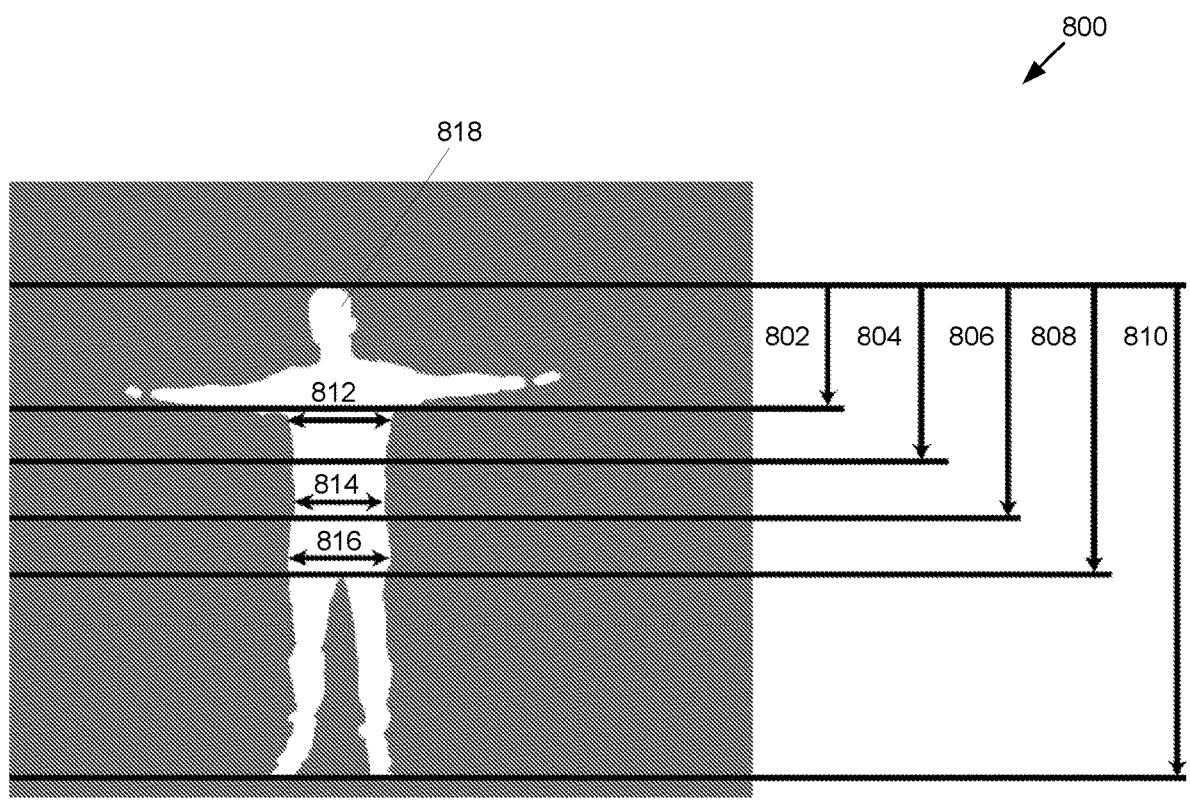
FIG. 8 illustrates an exemplary graphic of user body information captured by a depth sensor.

By way of non-limiting illustration, FIG. 8 includes a visual depiction user body information. The user body information may include visual content of the body silhouette 818, and/or other visual content associated with the user's body. The user may be user 218 (FIG. 2). The body silhouette 818 includes a set torso parameters, a set height parameters, and other information. The values of the set torso parameters and the set height parameters may include one or more of a first set of values 812 for a first set of torso parameters (e.g., a width parameter and/or a depth parameter), a first value 802 for a height parameter, a second set of values 814 for the first set of torso parameters, a second value 804 for the height parameter, a third set of values 816 for the first set of torso parameters, a third value 806 for the height parameter.

In some implementations, the first set of values 812 for the first set of torso parameters may be associated with the first value 802 for the height parameter. The first set of values 812 may include one or more of a first value for a width parameter and a second value for a depth parameter. The second set of values 814 for the first set of torso parameters may be associated with the second value 804 for the height parameter. The second set of values 814 for the first set of torso parameters may include one or more of a third value for the width parameter and a fourth value for the depth parameter. The third set of values 816 for the first set of torso parameter may be associated with the third value 806 for the height parameter. The third set of values 816 for the first set of torso parameters may include one or more of a fifth value for the width parameter and a sixth value for the depth parameter.

Returning to FIG. 1, one or more servers 102, computing platform(s) 114, one or more imaging device(s) 119, depth sensor 120, and/or external resources 128 may be operatively linked via one or more electronic communication links. For example, such electronic communication links may be established, at least in part, via a network (e.g., network(s) 126) such as the Internet and/or other networks. It will be appreciated that this may be not intended to be limiting and that the scope of this disclosure includes implementations in which one or more servers 102, computing platform(s) 114, one or more imaging device(s) 119, depth sensor 120, and/or external resources 128 may be operatively linked via some other communication media.

The external resources 128 may include sources of information that are outside of system 100, external entities participating with system 100, and/or other resources. In some implementations, some or all of the functionality attributed herein to external resources 128 may be provided by resources included in system 100.

Server(s) 102 may include one or more non-transitory electronic storage 122, one or more processors 124, and/or other components. Server(s) 102 may include communication lines or ports to enable the exchange of information with a network and/or other computing platforms. Illustration of server(s) 102 in FIG. 1 may be not intended to be limiting. The server(s) 102 may include a plurality of hardware, software, and/or firmware components operating together to provide the functionality attributed herein to server 102. For example, server(s) 102 may be implemented by a cloud of computing platforms operating together as server(s) 102.

Non-transitory electronic storage 122 may comprise non-transitory electronic storage media that electronically stores information. The non-transitory electronic storage media of the non-transitory electronic storage may include one or both of storage that may be provided integrally (i.e., substantially non-removable) with the respective device and/or removable storage that may be removably connectable to server(s) 102. Removable storage may include, for example, a port or a drive. A port may include a USB port, a firewire port, and/or other port. A drive may include a disk drive and/or other drive. Non-transitory electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The non-transitory electronic storage 122 may include one or more virtual storage resources (e.g., cloud storage, a virtual private network, and/or other virtual storage resources). Non-transitory electronic storage 122 may store files, software algorithms, information determined by processor(s), and/or other information that enables server 102 to function as described herein.

Processor(s) 124 may be configured to provide information-processing capabilities in the server(s) 102. As such, processor(s) 124 may include one or more of a digital processor, an analog processor, a digital circuit designed to process information, an analog circuit designed to process information, a state machine, and/or other mechanisms for electronically processing information. Although the processor(s) 124 are shown in FIG. 1 as single entity within the server(s) 102, this may be for illustrative purposes only. In some implementations, the processor(s) 124 may include one or more processing units. These processing units may be physically located within the same device or may represent processing functionality of a plurality of devices operating in coordination.

For example, processor(s) 124 may be configured to execute machine-readable instructions 105 including components 104, 106, 108, and/or 110. Processor(s) 124 may be configured to execute components 104, 106, 108, and/or 110 by software; hardware; firmware; some combination of software, hardware, and/or firmware; and/or other mechanisms for configuring processing capabilities on processor(s) 124. It should be appreciated that, although components 104, 106, 108, and/or 110 are illustrated in FIG. 1 as being co-located within a single processing unit, in implementations in which processor 124 includes multiple processing units, one or more of components 104, 106, 108, and/or 110 may be located remotely from the other components. The description of the functionality provided by the different components 104, 106, 108, and/or 110 described above may be for illustrative purposes and may be not intended to be limiting, as any of components 104, 106, 108, and/or 110 may provide more or less functionality than may be described. For example, one or more of components 104, 106, 108, and/or 110 may be eliminated, and some or all of its functionality may be provided by other ones of components 104, 106, 108, and/or 110 and/or other components.

Figure 9:
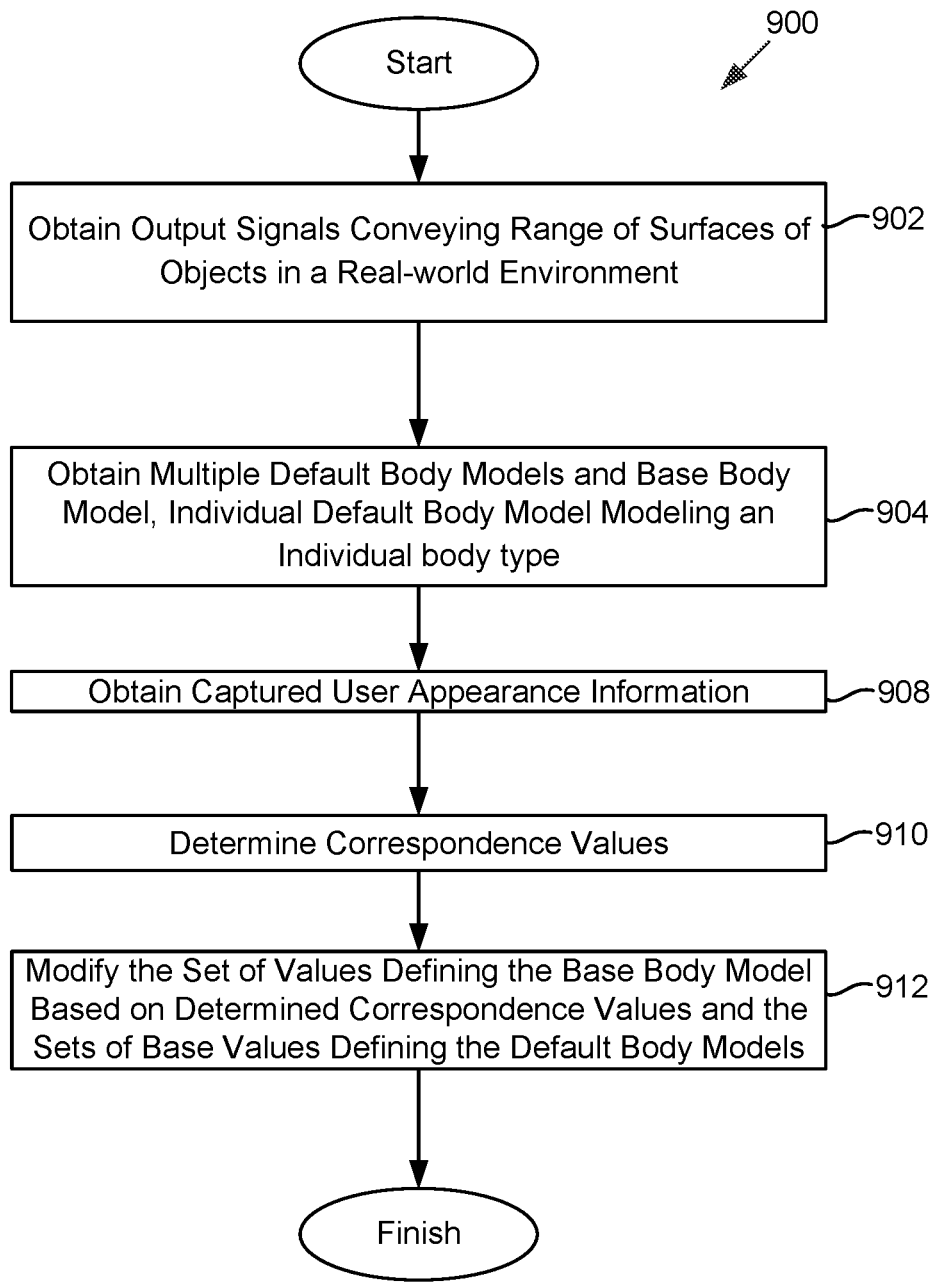
FIG. 9 illustrates a method configured to generate a body virtual entities representing real-world users.

FIG. 9 illustrates an implementation of a method 900 to generate virtual entities representing real-world users. The operations of method 900 presented below are intended to be illustrative. In some implementations, method 900 may be accomplished with one or more additional operations not described and/or without one or more of the operations discussed. Additionally, the order in which the operations of method 900 are illustrated in FIG. 9 and described below may be not intended to be limiting.

In some implementations, method 900 may be implemented in one or more processing devices (e.g., a computing platform, a digital processor, an analog processor, a digital circuit designed to process information, an analog circuit designed to process information, a state machine, and/or other mechanisms for electronically processing information) and/or one or more other components. The one or more processing devices may include one or more devices executing some or all of the operations of method 900 in response to instructions stored electronically on a non-transitory electronic storage medium. The one or more processing devices may include one or more devices configured through hardware, firmware, and/or software to be specifically designed for execution of one or more of the operations of method 900.

Referring now to method 900 in FIG. 9, at an operation 902, a depth sensor may be configured to generate output signals defining depth information and/or other information. The depth information may convey one or more of a range of surfaces of objects in a real-world environment. The depth information conveying one or more of the range of surfaces of objects in the real-world environment may include one or more of the user appearance information and/or other information. In some implementations, the depth information may include information of one or more of a user's body shape, a body outline, a body silhouette, and/or other information associated with the user's body. The one or more of the user's body shape, the body outline, the body silhouette, and/or other information associated with the user's body may be conveyed by one or more of an image, a video, and/or other visual content. The one or more of the image, the video, and/or other visual content may be defined by one or more of an array of pixels. The depth information may be stored in one or more electronic storage and/or other storage locations. In some implementations, operation 902 may be performed by one or more physical processors executing machine-readable instructions and one or more depth sensors 120 (shown in FIG. 1 and described herein).

At an operation 904, one or more of a base body model, a default body model, a skeleton model, a base head model, a default head model, and/or other information may be obtained. In some implementations, operation 902 may be performed using non-transitory electronic storage the same or similar as non-transitory electronic storage 122 (shown in FIG. 1 and described herein).

At an operation 908, captured user appearance information may be obtained. The user appearance information may include user body information, user head information, and/or other information. The user appearance information may be determined by one or more of depth information, image information, and/or other information. The depth information may include one or more human body outlines, silhouette, and/or other information corresponding to the user appearance. The one or more human body silhouette may include one or more values corresponding to one or more of a height, width, depth, and/or other measurements. The user body information may include one or more array of pixels representing the user's body. Measurement values associated with the user body information may be determined by one or more pixel distances of the one or more array of pixels. The user body information may include a set of values for torso parameters and one or more values for a height parameter. The values for the torso parameters may include one or more values of a height parameter, a width parameter, a depth parameter, and/or other information. The torso parameters associated with the user body information may also be referred to as user's body measurement values. In some implementations, operation 910 may be performed by one or more physical processors executing a body component the same as or similar to body component 106 (shown in FIG. 1 and described herein).

At an operation 910, correspondence value may be determined based on one or more of a user body dimension ratio, a base body model dimension ratio, a default body model dimension ratio, and/or other values. The correspondence values may be determined based on relationships between the user body dimension ratio, the base body model dimension ratio, the default body model dimension ratio, and/or other values. In some implementations, the relationships may be one or more of a difference, a ratio, a correlation, and/or other relationship between values. In a non-limiting example, the correspondence values may be determined by comparing the ratio of the difference between the user body dimension ratio to the base body model dimension ratio and the difference between the default body model dimension ratio to the base body model dimension ratio. In some implementations, operation 910 may be performed by one or more physical processors executing a body component the same as or similar to body component 106 (shown in FIG. 1 and described herein).

At an operation 912, a base body model may be modified. The base body model may be modified based on the correspondence values and default body models such that the base body model resembles the user's body. The base body model may be morphed based on the individual default body models. The body component may modify the set of values defining the base body model based on determined correspondence values and the sets of base values defining the default body models such that the base body model may be modified to model the appearance of the head of the body. In some implementations, operation 912 may be performed by one or more physical processors executing a body component the same as or similar to body component 106 (shown in FIG. 1 and described herein).

Figure 10:
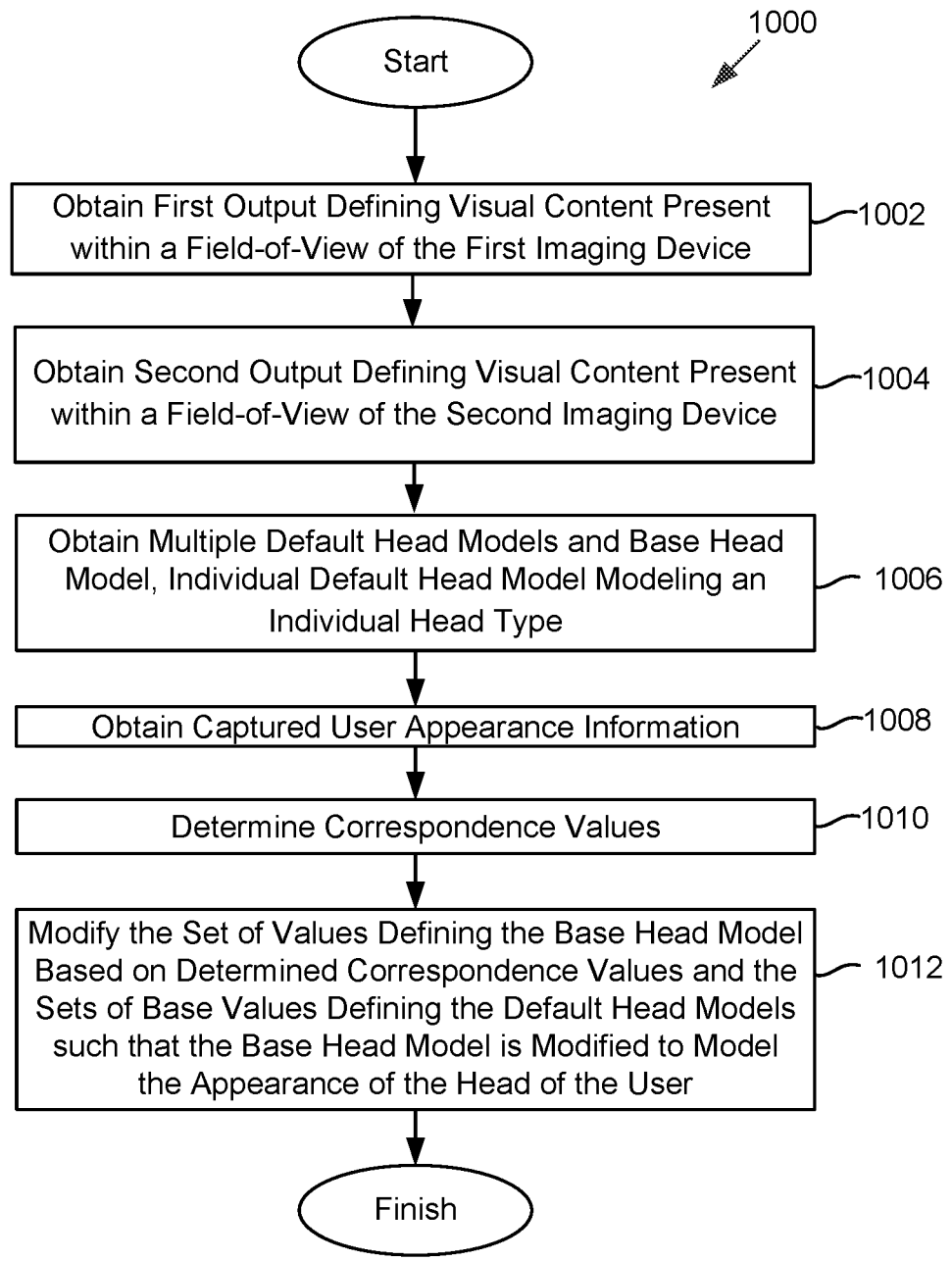
FIG. 10 illustrates a method configured to generate a head virtual entities representing real-world users.

FIG. 10 illustrates an implementation of a method 1000 to generate virtual entities representing real-world users. The operations of method 1000 presented below are intended to be illustrative. In some implementations, method 1000 may be accomplished with one or more additional operations not described and/or without one or more of the operations discussed. Additionally, the order in which the operations of method 1000 are illustrated in FIG. 10 and described below may be not intended to be limiting.

In some implementations, method 1000 may be implemented in one or more processing devices (e.g., a computing platform, a digital processor, an analog processor, a digital circuit designed to process information, an analog circuit designed to process information, a state machine, and/or other mechanisms for electronically processing information) and/or one or more other components. The one or more processing devices may include one or more devices executing some or all of the operations of method 1000 in response to instructions stored electronically on a non-transitory electronic storage medium. The one or more processing devices may include one or more devices configured through hardware, firmware, and/or software to be specifically designed for execution of one or more of the operations of method 1000.

At an operation 1002, an imaging device may include one or more image sensors and/or other sensors. The image sensor may be configured to generate output signals conveying light and/or electromagnetic radiation incident on the image sensor, and/or other information. The output signals may defining visual content present within a field-of-view of the imaging device. The output signals of an image sensor may be define as image information. The image information of the imaging device may include user appearance information. In some implementations, image information from the image sensor may be an array of pixels. The image information may be stored in one or more electronic storage 122 and/or other storage locations. A first imaging device with a first image sensor may generate output signals defining visual content present within a field-of-view of the first imaging device. In some implementations, operation 1002 may be performed by one or more physical processors executing machine-readable instructions and one or more imaging device(s) 119 (shown in FIG. 1 and described herein).

Referring now to method 1000 in FIG. 10, at an operation 1004, an imaging device may include one or more image sensors and/or other sensors. The image sensor may be configured to generate output signals conveying light and/or electromagnetic radiation incident on the image sensor, and/or other information. The output signals may define visual content present within a field-of-view of the imaging device. The output signals of an image sensor may define as image information. The image information of the imaging device may include user appearance information. In some implementations, image information from the image sensor may be an array of pixels. The image information may be stored in one or more electronic storage 122 and/or other storage locations. A second imaging device with a second image sensor may generate output signals defining visual content present within a field-of-view of the second imaging device. In some implementations, operation 1004 may be performed by one or more physical processors executing machine-readable instructions and one or more imaging device(s) 119 (shown in FIG. 1 and described herein).

At an operation 1006, one or more of a base body model, a default body model, a skeleton model, a base head model, a default head model, and/or other information may be obtained from non-transitory electronic storage 122.

At an operation 1008, user appearance information may be obtained. The user appearance information may include user head information and/or other information. The user head information may specify the appearance of the head of a real-world user. The user head information may include visual content (e.g., images, texture maps, and/or other information) of one or more of the user's facial features, head shape, facial textures, facial expressions, and/or other visual content associated with the user's head. In some implementations, operation 1010 may be performed by one or more physical processors executing a body component the same as or similar to head component 108 (shown in FIG. 1 and described herein).

At an operation 1010, correspondence values may be determined. In some implementations, the correspondence values may be determined by a comparison between the appearance of the user's head and the appearance of the default head models. The correspondence values may be determined by selecting correspondence values that minimizes the differences between the appearance of the user's head and the default head models. In some implementations, the differences between the appearance of the user's head and the default head models may be determined by comparing the user feature map with the default head model feature map. In some implementations, operation 1010 may be performed by one or more physical processors executing a head component the same as or similar to head component 108 (shown in FIG. 1 and described herein).

At an operation 1012, a base head model may be modified. In some implementations, the base head model may be modified based on the correspondence values and default head models such that the base head model resembles the user's head and/or face. The base head model may be morphed based on the individual default head models. The set of values defining the base head model may be modified based on determined correspondence values and the sets of base values defining the default head models such that the base head model may be modified to model the appearance of the head of the user. A sum of the modification of the base head model by the individual default head models may result in a modified base head model that resembles the appearance of the head of the user. In some implementations, operation 1012 may be performed by one or more physical processors executing a head component the same as or similar to head component 108 (shown in FIG. 1 and described herein).

Although the present technology has been described in detail for the purpose of illustration based on what may be currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system to generate body measurements, the system comprising:
   a sensor configured to generate output signals conveying depth information, the depth information including range of surfaces of objects in a real-world environment;
   non-transitory electronic storage storing multiple body type models and a base body model, an individual body type model modeling an individual body type representing an individual predetermined set of human body characteristics, the individual predetermined set of human body characteristics being defined by an individual set of base values for a set of body modeling parameters, the base body model being defined by a set of values for the set of body modeling parameters; and
   one or more physical processors configured by machine-readable instructions:
      obtain user body information, the user body information being defined by the depth information, the user body information specifying an appearance of a body of a real-world user; and
      determine correspondence values conveying correspondences between the appearance of the body of the real-world user and individual ones of the multiple body type models using the user body information and sets of base values of the multiple body type models;
   wherein determining the correspondence values comprises determining a user body dimension ratio;
   wherein the user body dimension ratio specifies a relationship between two or more of a height, a width, a depth, or a focal length;
   wherein the focal length is a focal length of the sensor;
   wherein the user body dimension ratio is a value determined by the depth multiplied by the width, divided by the focal length, where the value is then divided by the height.

2. The system of claim 1, wherein human body characteristics include size and/or shape of one or more of an upper body, a lower body, or an overall body size.

3. The system of claim 1, wherein the user body information includes:
   a first set of values for a first set of torso parameters and a first value for a height parameter, the first set of values for the first set of torso parameter being associated with the first value for the height parameter, wherein the first set of values for the first set of torso parameters include a second value for a width parameter, and a third value for a depth parameter;
   a second set of values for the first set of torso parameters and a fourth value for the height parameter, the second set of values for the first set of torso parameters being associated with the fourth value for the height parameter, wherein the second set of values for the first set of torso parameters include a fifth value for the width parameter, and a sixth value for a depth parameter; and a third set of values for the first set of torso parameters and a seventh value for the height parameter, the third set of values for the first set of torso parameters being associated with the seventh value for the height parameter, wherein the third set of values for the first set of torso parameters include a eighth value for the width parameter and a ninth value for the depth parameter.

4. The system of claim 3, wherein a first correspondence value is determined based on the first set of values for the first set of torso parameter and the first value for the height parameter, a second correspondence value is determined based on the second set of values for the first set of torso parameters and the fourth value for the height parameter, and a third correspondence value is determined based on the third set of values for the first set of torso parameters and the seventh value for the height parameter.

5. The system of claim 1, wherein a gender of the real-word user is determined based on the depth information or image information.

6. The system of claim 1, wherein an overall height of the base body model is modified based on an overall height of the user.

7. A method to generate body measurements, the method being implemented a system comprising a sensor, non-transitory electronic storage, and one or more physical processors, the method comprising:
generating output signals conveying depth information, the depth information including range of surfaces of objects in a real-world environment;
storing multiple body type models and a base body model, an individual body type model modeling an individual body type representing an individual predetermined set of human body characteristics, the individual predetermined set of human body characteristics being defined by an individual set of base values for a set of body modeling parameters, the base body model being defined by a set of values for the set of body modeling parameters;
obtaining user body information, the user body information being defined by the depth information, the user body information specifying an appearance of a body of a real-world user; and
determining correspondence values conveying correspondences between the appearance of the body of the real-world user and individual ones of the multiple body type models using the user body information and sets of base values of the multiple body type models;
wherein determining the correspondence values comprises determining a user body dimension ratio;
wherein the user body dimension ratio specifies a relationship between two or more of a height, a width, a depth, or a focal length,
wherein the focal length is a focal length of the sensor;
wherein the user body dimension ratio is a value determined by the depth multiplied by the width, divided by the focal length, where the value is then divided by the height.

8. The method of claim 7, wherein human body characteristics include size and/or shape of one or more of an upper body, a lower body, or an overall body size.

9. The method of claim 7, wherein the user body information includes:
a first set of values for a first set of torso parameters and a first value for a height parameter, the first set of values for the first set of torso parameter being associated with the first value for the height parameter, wherein the first set of values for the first set of torso parameters include a second value for a width parameter, and a third value for a depth parameter;
a second set of values for the first set of torso parameters and a fourth value for the height parameter, the second set of values for the first set of torso parameters being associated with the fourth value for the height parameter, wherein the second set of values for the first set of torso parameters include a fifth value for the width parameter, and a sixth value for a depth parameter; and
a third set of values for the first set of torso parameters and a seventh value for the height parameter, the third set of values for the first set of torso parameters being associated with the seventh value for the height parameter, wherein the third set of values for the first set of torso parameters include a eighth value for the width parameter and a ninth value for the depth parameter.

10. The method of claim 9, wherein a first correspondence value is determined based on the first set of values for the first set of torso parameter and the first value for the height parameter, a second correspondence value is determined based on the second set of values for the first set of torso parameters and the fourth value for the height parameter, and a third correspondence value is determined based on the third set of values for the first set of torso parameters and the seventh value for the height parameter.

11. The method of claim 7, wherein a gender of the real-word user is determined based on the depth information or image information.

12. The method of claim 7, wherein an overall height of the base body model is modified based on an overall height of the user.

* * * * *